United States Patent
Jacobson

(10) Patent No.: US 9,590,524 B1
(45) Date of Patent: Mar. 7, 2017

(54) APPARATUS AND METHOD FOR A POWER CONVERTER AND SYSTEM HAVING FOLDBACK CURRENT LIMIT

(71) Applicant: Raytheon Company, Waltham, MA (US)

(72) Inventor: Boris S. Jacobson, Westford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/996,677

(22) Filed: Jan. 15, 2016

(51) Int. Cl.
*H02H 7/125* (2006.01)
*H02M 7/217* (2006.01)
*H02M 1/32* (2007.01)
*H02M 1/00* (2006.01)

(52) U.S. Cl.
CPC ............. *H02M 7/217* (2013.01); *H02M 1/32* (2013.01); *H02M 2001/0009* (2013.01)

(58) Field of Classification Search
CPC ... H02M 7/125; H02H 7/1252; H02H 7/1255; H02H 7/1257; H02H 7/127
USPC .......................................................... 363/53
See application file for complete search history.

(56) References Cited

U.S. PATENT DOCUMENTS

| | | | |
|---|---|---|---|
| 6,856,283 B2 * | 2/2005 | Jacobson | G01S 7/282 342/175 |
| 7,839,201 B2 | 11/2010 | Jacobson | |
| 8,049,358 B2 | 11/2011 | Crane et al. | |
| 8,076,967 B2 | 12/2011 | Jacobson | |
| 2012/0206947 A1* | 8/2012 | Haight | H02M 7/217 363/84 |
| 2014/0160805 A1* | 6/2014 | Oh | H02M 3/33507 363/21.02 |

OTHER PUBLICATIONS

Salato et al.: "350V to 12V DC "Yeaman Topology" Power System", Applications Engineering V-I CHIP Inc., (a VICOR Company) Andover, MA, U.S.A., Dec. 16, 2010, Energy Aware Computing (ICEAC), 2010 International Conference, IEEE, ISBN 978-1-4244-8273-3, 4 pages.

(Continued)

*Primary Examiner* — Adolf Berhane
*Assistant Examiner* — Afework Demisse
(74) *Attorney, Agent, or Firm* — Daly, Crowley, Mofford & Durkee, LLP

(57) ABSTRACT

A power converter system configured to supply DC power to a load is provided, comprising a power converter device responsive to an AC input voltage and configured to provide an output DC voltage; an output voltage loop controller in operable communication with the power converter; an output current loop controller in operable communication with the power converter; an output power loop controller in operable communication with the power converter; and a foldback controller in operable communication with the power converter. The output voltage loop controller, the output current loop controller, the output power loop controller, and the foldback controller together control the power converter to provide a multi-sloped output characteristic, including constant output voltage in voltage mode, increased output current in a first constant power mode, decreased output current and voltage in a foldback mode, and increasing output current and decreasing output voltage in a second constant power mode.

20 Claims, 18 Drawing Sheets

(56) References Cited

OTHER PUBLICATIONS

Mussmacher et al.: "Controllers Guard Against Arc Faults", Power Electronics Technology, Nov. 2004, www.powerelectronics.com, 5 pages.
Mussmacher et al.: "Controllers Guard Against Arc Faults", Nov. 1, 2004, 5 pages, http://powerelectronics.com/content/controllers-guard-against-arc-faults.

* cited by examiner

APPARATUS AND METHOD FOR A POWER CONVERTER AND SYSTEM HAVING FOLDBACK CURRENT LIMIT

CROSS REFERENCE TO RELATED APPLICATIONS

Not applicable

STATEMENT REGARDING FEDERALLY SPONSORED RESEARCH

Not Applicable.

FIELD

Embodiments disclosed herein generally relate to power supplies and systems. More particularly, at least some disclosed embodiment relate to systems, methods, and device to provide a power converter with foldback current limiting and with reduced probability of dangerous arc flashes.

BACKGROUND

Electric arcs can occur when ionized air breaks down into plasma that carries a stream of current between conductors or between a conductor and ground. Electric arcs that are large enough and that occur quickly enough are known as arc flashes (also referred to as flashovers). An arc fault is a type of electrical explosion or discharge that results from such a low-impedance connection through air to ground or another voltage phase in an electrical system. Arc faults generate pressure by expansion due to metal vaporization and rapid heating of air by arc passing through it. An arc creates copper vapor that expands to 67,000 times the volume of solid copper (e.g., 1 in3 of copper vaporizes into 1.44 yd3 of vapor). Air in an arc stream heats up to about 35,000° F. (Surface of the Sun: 8,540° F.). During an arc flash, electrical energy can vaporize a metal conductor carrying the electrical energy, causing the metal to changes from solid state to gas vapor, expanding it with an explosive force.

Arc flashes can cause dangerous explosions. Five to ten arc flash explosions occur in electric equipment every day in the U. S, with injuries so severe that the victims require treatment from a special burn center. Moreover, arc flash explosions likely cause many more less severe injuries that are not part of this five to ten number, because some injured victims are sent only to an ordinary hospital and do not require aid from burn centers. Arc flashes also can cause severe non-burn types of injuries. For example, a pressure wave from an arc flash has the potential to blow out eardrums or damage lungs, and the "flash" itself emits large doses of infrared and ultraviolet light that can blind temporarily or even permanently.

Power systems for electronic weapons systems present one type of major arc flash hazard. Many electronic weapons systems operate from high power DC sources (e.g., 300 to 1000 VDC) and can have energy storage in the range of farads. Arcs lengthen and intensify as voltage and current increase, so the higher voltages used in these system increases the risk and dangerous consequences of arc flashes. Undersea systems, which operate at about 10 kV DC, present similar challenges. New electronic warfare systems require megawatts of power in the hundreds of volts to kilovolts voltage range. Use of these types of high DC voltages increases the risk of arc flash. The new radar requirements recognize this risk and include particular requirements for prevention of shocks and burns, specifying that the power system must have an arc resistant design implemented via construction techniques and features such as adequate conductor spacing, insulated bus work, and high bus ratings (e.g., 250 kVA). The requirements also specify use of elements to mitigate the consequences of an electrical arc by incorporating pressure relief vents and champers to redirect pressure for bus ratings exceeding the bus rating.

Another type of system that can present a significant arc flash hazard includes systems and locations that use high voltage DC, such as industrial computing and telecommunication markets, including large server systems and data centers. These systems increasingly use high voltage DC distribution systems to increase accommodate the high power demands of digital processors, improve efficiency, reduce power distribution losses, and reduce the size and weight of the systems. For example, in the United States, Japan, and selected other countries, at least some computer manufacturers have adopted 360 VDC as their standard input supply voltage. In addition, digital processors continually require more power. Other markets, including military markets, use 750-1000 VDC distribution systems.

The astronomical growth in data center power use—and the huge electrical supply sources they require—creates the potential for bigger and more dangerous electric arcs, and more places where they can cause damage. Damage in such server systems and data centers can have both a huge human toll and a significant financial cost (especially if data is damaged or destroyed). In addition, the drive for higher efficiency and lighter power distribution systems is expected to increase the source voltage of other types of systems. Thus, it is expected that the problems due to high voltage arc flash will become more prevalent, unless techniques are developed to help, detect, prevent, and mitigate for these types of faults.

SUMMARY

Different techniques have been developed to prevent or reduce damaging impact from problems like arc flash hazards. Different solutions are applied depending on the levels of current and voltage involved. For example, circuit breakers can protect against some types of electrical issues, but known circuit breakers can take milliseconds to clear faults and do not give reliable protection against arc flash/blast hazard. DC arcs are especially hard to interrupt, because the current doesn't naturally go through zero.

For example, FIG. 1 is a first graph 100 showing exemplary prior art power converter volt-ampere (V-A) characteristics at a system interface. As FIG. 1 shows, the output characteristics in this system have three slopes, corresponding to closed feedback loops in the associated power system. The voltage mode 102 is associated with light and nominal loads. The power mode 104 is associated with heavy and pulsed loads. Full output power is generally seen at the point labeled 106 in FIG. 1, which is the point with maximum output current, and the highest output voltage value associated with that current. After the point of full output power 106, the output characteristics correspond to a so-called current mode 108, which is associated with startup conditions and overload conditions. The current mode 108 is associated with the current limit of the associated system. As FIG. 1 shows, a plasma arc 110 can be sustained at full output power.

FIG. 2 is a second graph 120 showing output V-A characteristics of an exemplary prior art series resonant converter (SRC) with clamped capacitor voltage type of power converter. FIG. 2 is similar to FIG. 1, but shows that the maximum power curve 112 of the SRC provides an intrinsic power limit under an overload condition. But, this intrinsic power limit may not be enough to prevent arc flashes under these conditions.

Some solutions have been proposed for this problem, but at least some known approaches for mitigating arc faults and flashes do not provide the ability to inhibit arcs at the power converter output.

Foldback is one technique that has been used to attempt to limit output current into faults. Reference is now made briefly to FIG. 5, which is an illustrative graph 200 showing voltage output vs current output, and knee current, in an exemplary foldback system. When the conventional foldback method is employed, if an overload condition exists, the output voltage and current reduce to safe levels. As can be seen from the curve in the graph 200 of FIG. 5, should an overload occur, the supply will provide current up its current limit point (aka 'knee'), and then the output current will fold-back to a lower value as the output voltage reduces towards zero. This technique is employed in some linear power supplies because it reduces the strain on the supply's internal power devices to minimum. Depending upon the design, recovery from a fold-back current limit condition can be automatic, or after a built-in time delay when the overload condition is removed.

For example, one prior art patent describes a method that uses triple-sloped output V-I characteristics to ensure power and current sharing (see commonly assigned U.S. Pat. No. 6,856,283 B2 "Method and Apparatus for Power System for Phased Array Radar," which patent is incorporated by reference). At least some of the methods, systems, and apparatuses described in the '283 patent are used, for example, in a 300 VDC radar system in the U.S. Navy Zumwalt class destroy and in the and CVN class ships Dual Band Radar (CVN, as used by the U.S. Navy, refers to nuclear powered aircraft carriers used with fixed wing aircraft).

FIG. 3 is an illustrative graph showing output V-A characteristics of an exemplary prior art system implementing current foldback, such as at least one of the systems shown in the '283 patent. Referring to FIG. 3, the output V-A characteristics exhibit a multi-sloped output characteristic, where the slope of the curve in FIG. 3 is the increment of the output voltage $\Delta V$ divided by the increment of the output current $\Delta I$. The first voltage mode slope 102 corresponds to a condition where the power needs of the load (which can, for example, be an antenna system) are lower. The first point of "knee current" 113a corresponds to the start of power mode 104, in which the load requires significant amounts of power, and this V-A slope continues until the second "knee" point 113b. Thus, the power system/power converter is able to supply full power up to its current limit point, which in FIG. 3 corresponds to knee #2 113b. At knee 113b, instead of keeping nearly constant current (corresponding to the solid line in FIG. 3), the power system is controlled so that there is reduction in both voltage and current as the output voltage goes to zero (corresponding to the "foldback mode" 114 in FIG. 3, as shown via a portion of the dotted line curve in FIG. 3).

One drawback of fold-back current limiting is that if the supply turns on into a heavy capacitive load, the power supply could latch-up (trigger an inadvertent short circuit, along a low impedance path) at a low current, instead of charging the output to full voltage. The problem is, with systems running at very high voltages (e.g., 700-1000 VDC and up), the "low" current, combined with the relatively high output voltage, still results in a lot of output power. For example, referring to FIG. 4, the Arc 2 110c crosses the line of the constant current at a first output voltage $V_{out, Arc2}$, $I_{out, Arc2}$. As can be seen in FIG. 4, if the output voltage is already a high voltage, the power at point $V_{out, Arc2}$, $I_{out, Arc2}$, (corresponding to Current I2 118B) can still correspond to enough output power to cause dangerous arc flashes.

With the foldback limit (as shown via the dotted line in FIGS. 3 and 4), the foldback limit reduces current for the same voltage (note that, at Voltage $V_{FB}$, I1<I2). Referring to FIG. 4, consider the output current in two different possible arcs occurring at an output voltage level of $V_{FB1}$. In the Arc 1 110b, at the output voltage VFB1, the output current is there is a current $I_1$, and in the Arc 2 110C, the current at voltage $V_{FB1}$ is $I_2$. To sustain an arc, there needs to be at least minimum current at a given voltage level. By limiting the current at a given voltage level, the foldback limit thus helps to impede plasma arc inception If a plasma arc does occur, it occurs with far less output power.

Even though foldback current limits help to impede inception of plasma arcs at dangerous levels, there are still some limitations with conventional foldback systems. Conventional foldback systems have some limitations. For example, for applications with high start-up current levels, such as those with high capacitive loads (e.g., a large capacitor bank, as is found in some high voltage power distribution systems), foldback circuits may be a potential problem if the current demand at startup exceeds the predetermined foldback current-limit set point. In that situation, the device or system requiring current may not start up or may start up then immediately shut down, or the device could latch-up at a low current instead of charging the output to full voltage.

Thus, for systems running at very high DC voltages, the foldback approach does not necessarily always ensure safe operation because with 1000 VDC source (or higher), the source arc must be extended to much greater length than for 300 VDC systems, until the voltage will not support it In one embodiment disclosed herein a solution is proposed that provides both improved arc flash resistance and the ability to feed (charge up) large capacitive loads. In this embodiment, the power converter/system is configured to be controlled to shift into a foldback mode after "knee" current is reached, to cut down power that is available to a potential arc, and the power converter/system is controlled to have a "second power mode" (corresponding to a "fourth" slope on the output V-A curve), where e this second power mode (which resembles a fold-forward mode) enables the power converter/system to provide more current at low voltage and low power for the initial charge of capacitive loads.

In one embodiment, a power converter system is provided, the power converter system configured to supply direct current (DC) power to a load, where the power converter system comprises a power converter device responsive to an alternating current (AC) input voltage and configured to provide an output DC voltage; an output voltage loop controller in operable communication with the power converter; an output current loop controller in operable communication with the power converter; an output power loop controller in operable communication with the power converter; and a foldback controller in operable communication with the power converter. The output voltage loop controller, the output current loop controller, the output power loop controller, and the foldback controller together control the power converter to provide a multi-sloped output characteristic, wherein the power converter provides a substantially constant output voltage when in a voltage mode controlled by the voltage loop controller; an increasing output current while output voltage decreases, in a first constant power mode controlled by the power loop controller, wherein the output current is permitted to increase up to a first predetermined current limit point defined for the power converter; a decreasing output current and decreasing output voltage, in a foldback mode controlled by the foldback controller, the foldback mode occurring after the output current reaches the first predetermined current limit point; and an increasing output current and decreasing output voltage, in a second power mode controlled by the power loop controller, wherein the output current is permitted to increase so long as the output voltage remains below a first predetermined charge limit threshold.

In one embodiment, the foldback controller is implemented using the current loop controller, such that the power converter system is implemented using three controller loops. In one embodiment, the foldback controller is implemented such that the power converter system is implemented using four controller loops, including a separate foldback loop controller.

In one embodiment, the second power mode is controlled to provide an increasing current, at decreasing voltage and decreasing power, wherein the combination of increasing current, decreasing voltage, and decreasing power, is configured to be sufficient for initial charge-up of a predetermined capacitive load in operable communication with an output of the power converter.

In one embodiment, the power converter further comprises a current sense circuit configured to sense when the power converter has reached a predetermined maximum current output threshold, wherein when the predetermined maximum current threshold is reached the foldback controller is configured to cause the power converter to provide output current and voltage in accordance with the foldback mode.

In one embodiment, the power converter is configured to dynamically monitor at least one of output voltage and output current and to dynamically define at least one threshold for going into at least one of voltage mode, first power mode, foldback mode, and second power mode, based at least in part on the at least one dynamically defined threshold.

In one embodiment, the power converter is configured to dynamically monitor output current to determine whether a first predetermined overload condition has occurred and, if the overload condition has occurred, the foldback controller is configured to cause the power converter to go into foldback mode.

In one embodiment, the power converter is configured to dynamically monitor at least one of output current and output voltage, during foldback mode, to determine when a first predetermined threshold of output voltage and output current has been reached, the first predetermined threshold corresponding to a condition wherein the output power is at a predetermined safe level configured so that an arc flash occurring at that output power would be below a second predetermined threshold.

In one embodiment, the power converter comprises a series resonant converter (SRC) having current limiting circuitry configured to limit output current if at least one of an overload and a fault condition occurs in the SRC. In one further embodiment, the power converter further comprises an overload sense circuit configured to detect when an overload or fault condition occurs in the SRC and to generate a corresponding output current feedback signal for the foldback loop controller, wherein the foldback controller defines a threshold for controlling foldback mode based at least in part on the output current feedback signal.

In another embodiment, the power converter further comprises an output current limiting circuit configured to provide an overload current feedback signal, and wherein the output current loop controller is configured be responsive to sensed values of the power converter output current and overload current feedback signal and to modify its output current by adding a predetermined fraction of the overload current feedback signal to its current loop feedback control signal. For example, in one embodiment the predetermined fraction ranges from about 0.3 to 0.7.

In another aspect a method is provided for supplying power from a power converter to a load, the power converter configured to provide an output voltage and an output current. The method comprises:
  controlling the power converter to provide substantially constant output voltage, when the power converter is in a voltage mode controlled by a voltage loop controller;
  controlling the power converter to provide increasing output current while output voltage decreases, when the power converter is in a first constant power mode controlled by a power loop controller, wherein the output current is permitted to increase up to a first predetermined current limit point defined for the power converter;
  controlling the power converter to provide a decreasing current and decreasing output voltage, when the power converter is in a foldback mode controlled by a foldback loop controller, the foldback mode occurring after the output current reaches the first predetermined current limit point; and
  controlling the power converter to provide an increasing current and decreasing output voltage, in a second power mode controlled by the power loop controller, wherein the output current is permitted to increase so long as the output voltage remains below a first predetermined charge limit threshold.

In one embodiment, the second power mode corresponds to a fold-forward power mode. In one embodiment, the method further comprises controlling the second power mode, to provide an increasing current, at decreasing voltage and decreasing power, wherein the combination of increasing current, decreasing voltage, and decreasing power, is configured to be sufficient for initial charge-up of a predetermined capacitive load in operable. communication with an output of the power converter. In one embodiment, the method further comprises sensing when the power converter has reached a predetermined maximum current output threshold, wherein when the predetermined maximum current threshold is reached the foldback controller is configured to cause the power converter to provide output current and voltage in accordance with the foldback mode.

In a further embodiment, the method further comprises:
  dynamically monitoring at least one of output voltage and output current for the power converter;
  dynamically monitoring an overload current signal for the power converter, the overload current signal based on information from a current limiting circuit in operable communication with the power converter; and
  dynamically defining, based at least in part on at least one of output current, output voltage, and the overload current signal, at least one threshold for going into at least one of voltage mode, first power mode, foldback mode, and second power mode, based at least in part on the at least one dynamically defined threshold.

In a further embodiment, the method further comprises dynamically monitoring power converter output current and the overload current signal to determine whether a first predetermined overload condition has occurred; and if the overload condition has occurred, controlling the power converter, using the foldback controller, to cause the power converter to go into foldback mode.

In another embodiment, the power converter comprises a series resonant converter (SRC), wherein the method further comprises detecting when an overload or fault condition occurs in the SRC, and generating a corresponding output current feedback signal for the foldback loop controller, wherein the foldback loop controller defines a threshold for controlling foldback mode based at least in part on the output current feedback signal.

In a further aspect, a power system is provided for providing power to a common load. The power system comprises:

a plurality of power converters operably coupled in parallel to a common DC power bus to which one or more loads may be connected, each respective power converter comprising:
- a power converter device responsive to an alternating current (AC) input voltage and configured to provide an output DC voltage;
- an output voltage loop controller in operable communication with the power converter;
- an output current loop controller in operable communication with the power converter;
- an output power loop controller in operable communication with the power converter; and
- a foldback controller in operable communication with the power converter;

wherein the output voltage loop controller, the output current loop controller, the output power loop controller, and the foldback controller together control the power converter to provide a multi-sloped output characteristic, wherein the power converter provides:
- a substantially constant output voltage when in a voltage mode controlled by the voltage loop controller;
- an increasing output current while output voltage decreases, in a first constant power mode controlled by the power loop controller, wherein the output current is permitted to increase up to a first predetermined current limit point defined for the power converter;
- a decreasing output current and decreasing output voltage, in a foldback mode controlled by the foldback controller, the foldback mode occurring after the output current reaches the first predetermined current limit point; and
- an increasing output current and decreasing output voltage, in a second power mode controlled by the power loop controller, wherein the output current is permitted to increase so long as the output voltage remains below a first predetermined charge limit threshold;

wherein the plurality of power converters cooperate to balance power provided to the common load via the DC power bus by balancing power provided to the common load among the plurality of power converters.

In one embodiment, each respective power converter further comprises a respective output current limiting circuit configured to provide a respective overload current feedback signal, and wherein the output current loop controller is configured be responsive to sensed values of the power converter output current and overload current feedback signal and to modify its respective output current by adding a predetermined fraction of the respective overload current feedback signal to its respective current loop feedback control signal.

Details relating to these and other embodiments are described more fully herein.

BRIEF DESCRIPTION OF THE DRAWINGS

The advantages and aspects of the described embodiments will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

At least some embodiments described herein are usable to increase arc flash resistance of power devices, especially high power converters and systems, combined with the ability to feed large capacitive loads. In one embodiment, described further herein, the power converter and system with foldback, as described herein, implements features that include output volt-ampere characteristics with four slopes and two power limits, including a voltage mode, a power mode, a foldback mode, and a second power mode (alternately termed a current mode and/or a fold-forward mode). In one embodiment, described further herein, a power converter is provided which is implemented as a series resonant converter (SRC) wherein the SRC uses current sensing of clamping diodes to detect overload and/or fault conditions and to generate an overload/fault feedback signal usable to control operation, including output power, voltage, and current, for the SRC. In addition, in one embodiment, the SRC adds an overload/fault feedback signal the output current feedback signal, to dynamically provide and/or define at least one current foldback limit.

In one embodiment, described further herein, a power converter is provided which has quad-slope characteristics that are achieved by three or four feedback loops. In a further embodiment, multiple power converters with quad slope characteristics are operably coupled together in parallel to feed a common load.

In one embodiment, described further herein, a method is provided for operating a power system and/or a power converter, in four modes, including Voltage mode from zero load to full load (positive slope)

First power mode from overload to current limit ("knee") (positive slope)

Foldback mode from current limit to charge limit (negative slope)

Second power mode from charge limit to zero voltage (positive slope)

Figure 6:
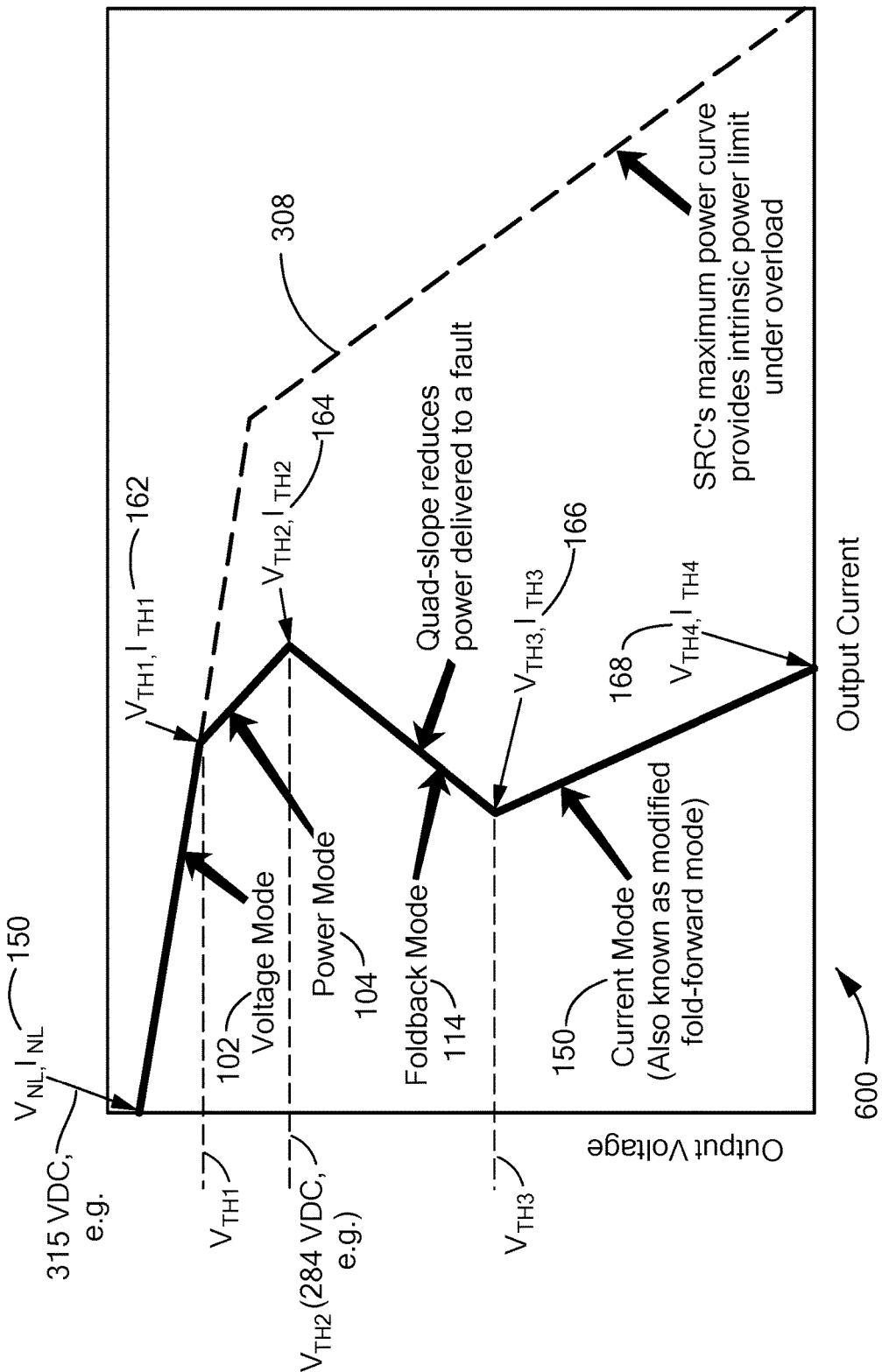
FIG. 6 is an illustrative graph showing output V-A characteristics of a power system with foldback and quad slope characteristics, in accordance with a first disclosed embodiment.
Figure 7:
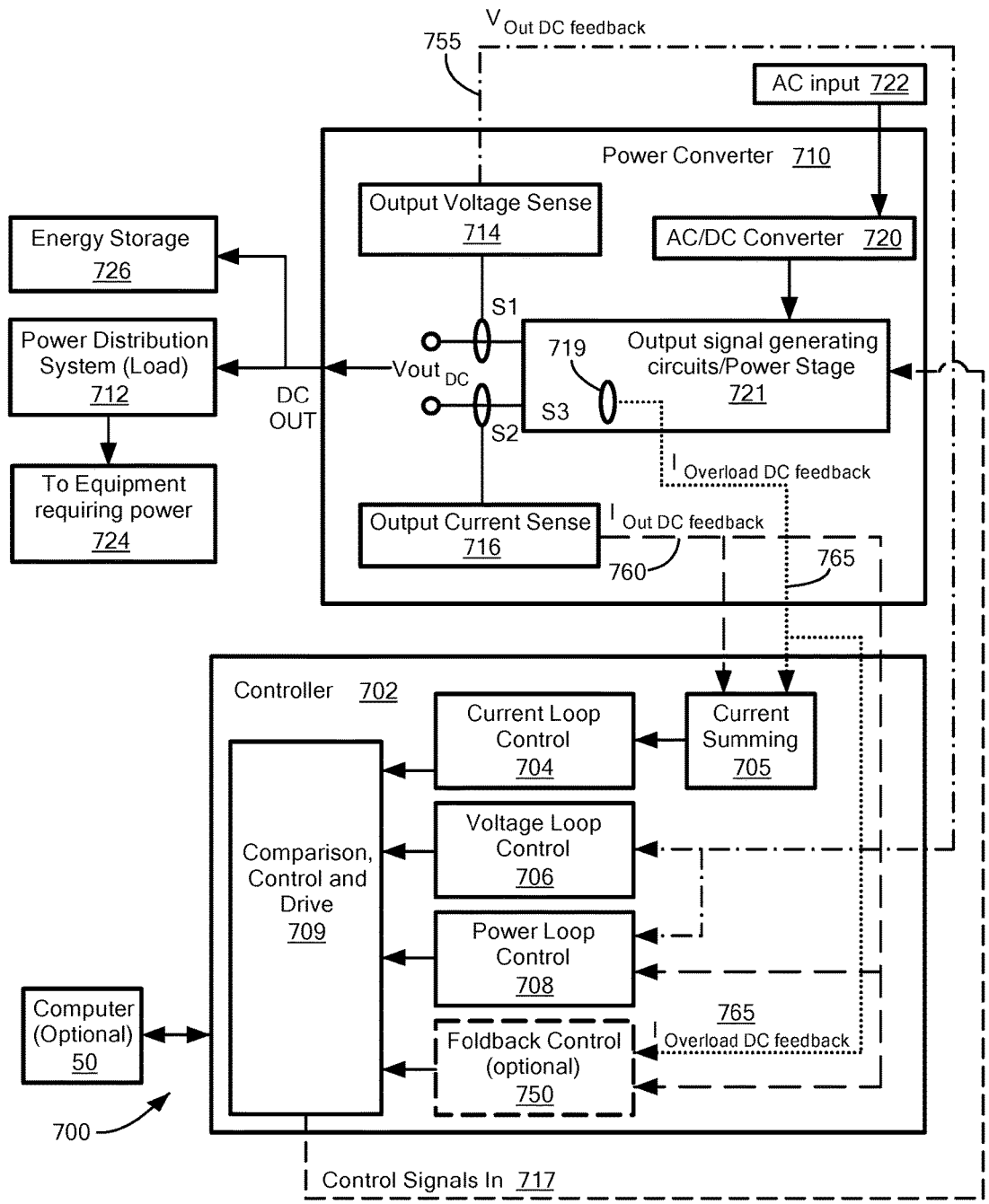
FIG. 7 is an exemplary functional block diagram of a power system that incorporates foldback and quad slope characteristics, in accordance with a second disclosed embodiment.
Figure 8:
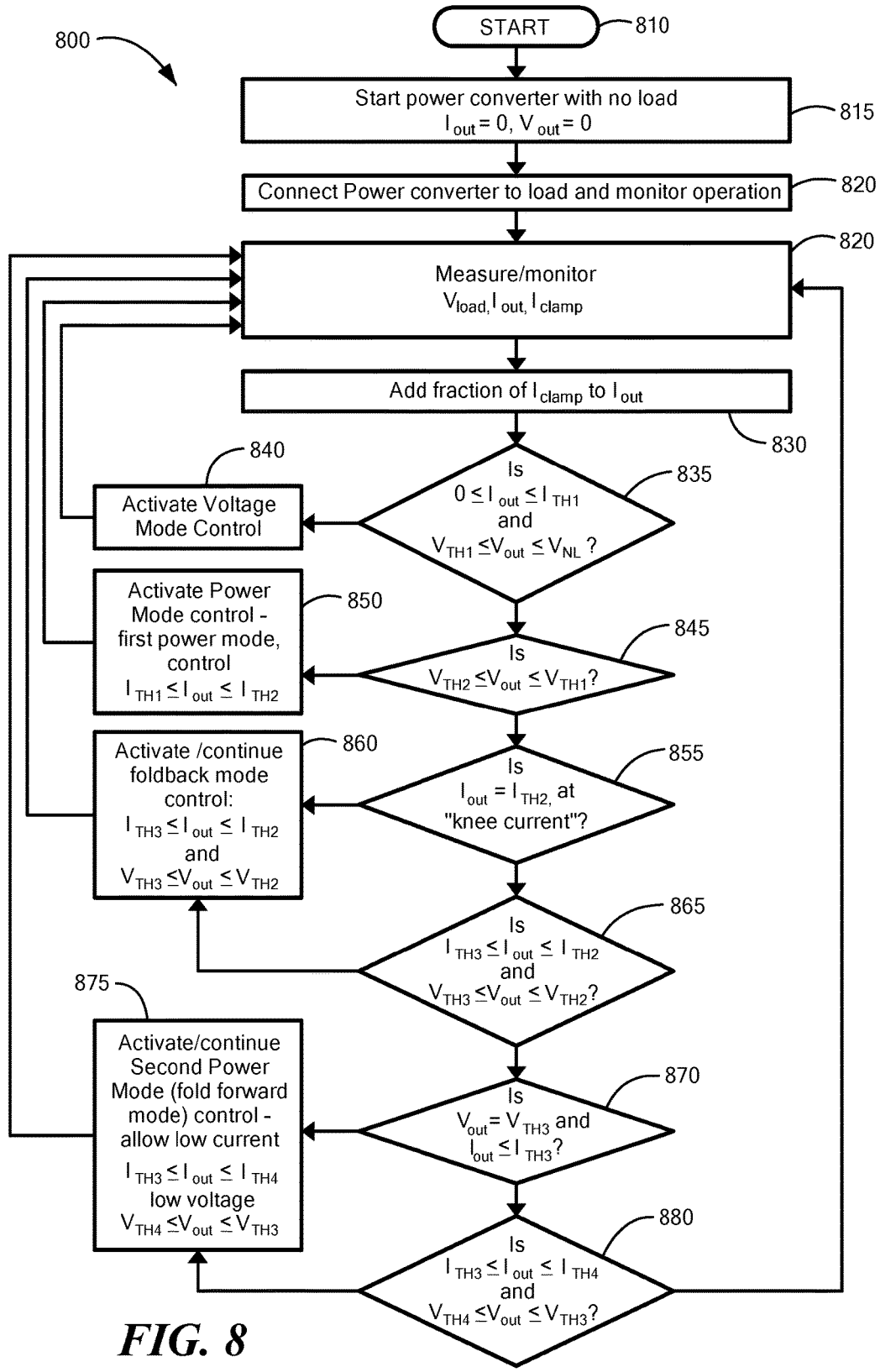
FIG. 8 is an exemplary flow chart showing a method of operating the system of FIG. 7 to achieve the output V-A characteristics of FIG. 6, in accordance with a third disclosed embodiment.

FIG. 6 is an illustrative graph 600 showing output V-A characteristics of a power system with foldback and quad slope characteristics, in accordance with a first disclosed embodiment. FIG. 7 is an exemplary block diagram of a power system 700 that incorporates foldback and quad slope characteristics, in accordance with a second disclosed embodiment. In one embodiment, the power system 700 of FIG. 7 is configured to operate in accordance with the output V-A characteristics shown in FIG. 6. FIG. 8 is an exemplary flow chart 800 showing a method of operating the system of FIG. 7 to achieve the output V-A characteristics of FIG. 6, in accordance with a third disclosed embodiment.

In particular, referring to FIGS. 6 and 7, the output V-A characteristic in the graph 600 shows a quad-slope characteristics, where the power system 700 having this characteristic is configured to be controlled to shift into a foldback mode 114 after "knee" current is reached (at point 164), to cut down power that is available to a potential arc, and the power system 700 is further controlled to have a "second power mode" 150 (corresponding to a "fourth" slope on the output V-A curve), also referred to as current mode 150 or fold-forward mode 150, where this second power mode 150 enables the power converter/system to provide more current at low voltage and low power for the initial charge of capacitive loads.

Referring briefly to FIG. 7, a power system 700 implemented in accordance with at least one embodiment, includes a controller 702 in operable communication with a power converter 710. The power converter 710 receives an AC input 722 at an AC/DC converter 710 (e.g., a rectifier circuit), so that an input AC voltage is converted to a DC voltage provided to the power stage 721. One or more sub-circuits (not shown) in the power stage 721 cooperate to provide an output current, at a predetermined rated voltage, to be provided to a load 712, such as power distribution system 712, which then distributes the power to one or more pieces of electrical equipment 724 that require power. The power converter 710 includes one or more sensors for monitoring current and voltage, including an output voltage sense circuit 714 that senses output voltage via a sensor S1, an output current sense 716 that senses output current via a sensor S2, and an overload current sense 719, which senses current through current limiting components (e.g., clamping diodes or other current limiting semiconductor components; as will be appreciated, other resonant topologies have clamping circuits that perform similar functions). For simplicity, the system shown in FIG. 7 omits elements such as shielding, filtering, ground, transformers, etc., which are well understood in the art.

The controller 702 can be implemented entirely in hardware, entirely in software, or using a mix of hardware and software, as will be appreciated. Optionally, as shown in FIG. 7, a computer system 50 can be used to assist in performing some or all of the control functions (the computer 50 is described further in FIG. 15). In the embodiment of FIG. 7, the controller 702 includes a current control block 704, a voltage control block 706, a power control block 708, and an optional foldback control block 750 (not used in all embodiments). A comparison and control block 709 receives the outputs of each of the current control block 704, the voltage control block 706, the power control block 708 and (optionally) the foldback control block 750, and, depending on which of these control blocks is enabled, generates a set of control signals in 717 that are received by and used in the power converter 710 to determine the current and voltage that are output to the load 712. This is explained father herein. In one embodiment, a current summing block 705 receives information about both the output current level (from output current sense 716) and from the clamped (current limited) level (from clamping sense 719), also referred to herein as the overload current sense signal 765. This current summing block 705, in certain embodiments, determines the sum of the clamping diodes' current (from sensor 719) and the output current (from sensor 716) modifies the current loop by adding a predetermined fraction of an overload current feedback signal, to the current signal provided to the current loop control 704.

Figure 3:
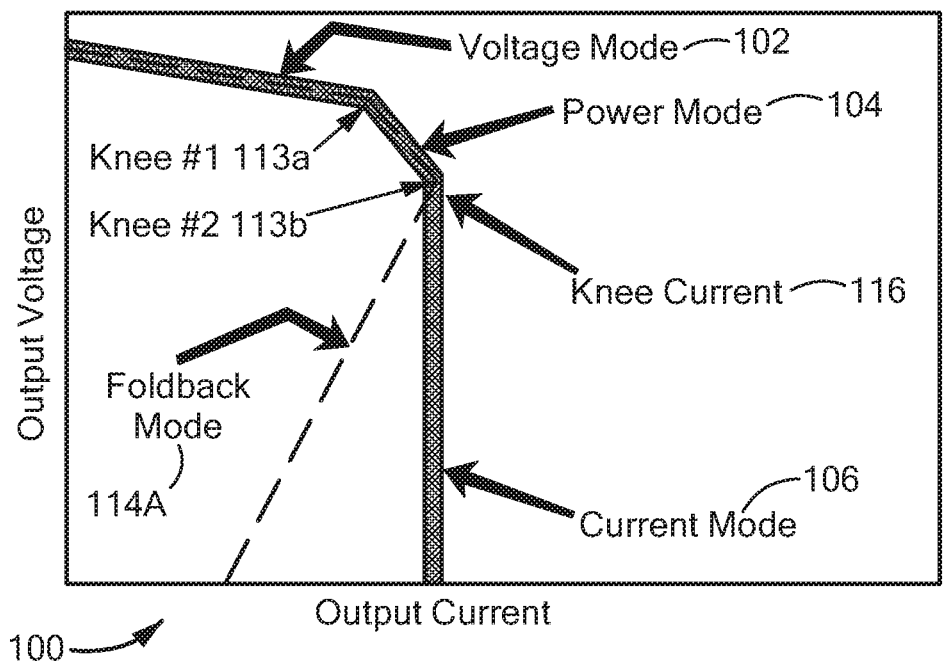
FIG. 3 is an illustrative graph showing output V-A characteristics of an exemplary prior art system implementing current foldback.
Figure 4:
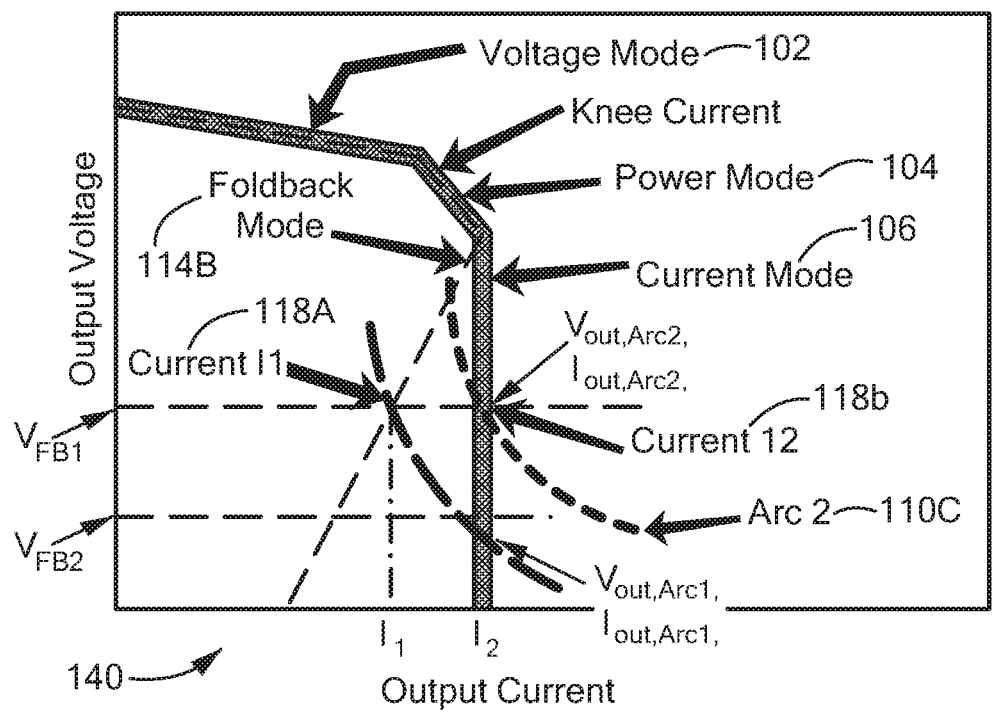
FIG. 4 is an illustrative graph showing output arc conditions occurring in the system of FIG. 2, including showing how a foldback mode helps to reduce output current at a given output voltage.
Figure 5:
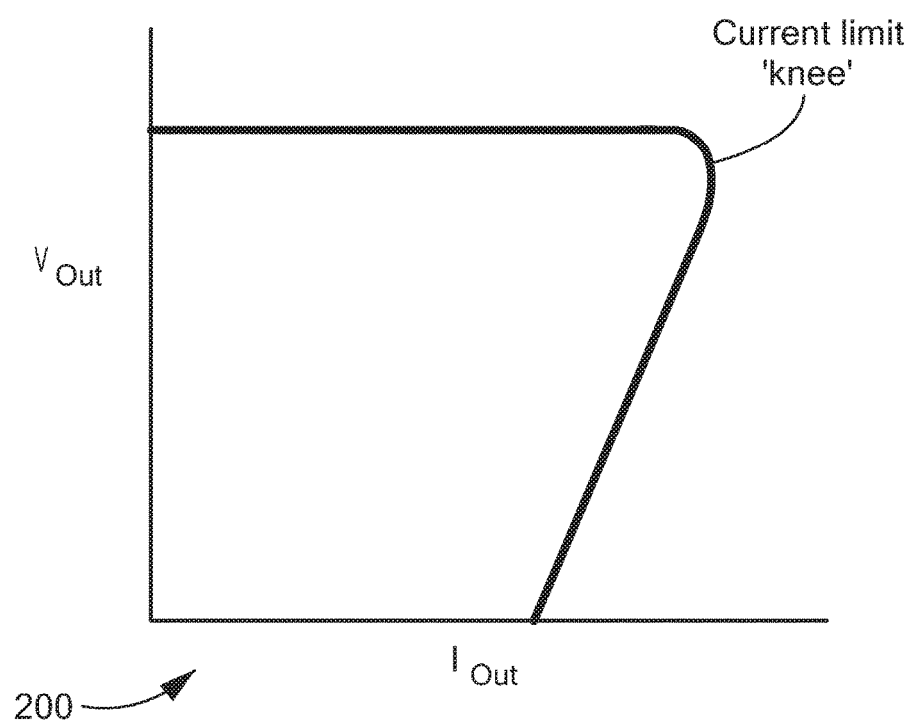
FIG. 5 is an illustrative graph showing voltage output vs current output, and knee current, in an exemplary foldback system.

Referring to FIGS. 6-8, the voltage mode 102 and first power mode 104 in FIG. 6 are analogous to the same modes as shown in the V-A graph 130 of FIG. 3. At the start (no load point 160) (block 810), the voltage $V_{NL}$ is at its maximum, and the no-load current $I_{NL}$ is at zero. Thus, output current and output voltage are zero (block 815). At this point, the energy storage device 726 needs to be charged.

When the load 712 is connected (block 820), the controller 702 begins its monitoring of the operation of power converter 710. Between point 160 and point 162 (FIG. 6), power needs of the load 712 are relatively low (e.g., light and nominal loads). In at least one embodiment (e.g., an embodiment implemented using a series resonant converter (SRC), or other circuit with current limiting), as part of this monitoring (block 820) a fraction of the current that is limited (e.g., clamp current) is added to the output current (block 830). For example, at the beginning of the charge-up process, when the output voltage is low the converter has high clamp currents that dominate the composite feedback signal $V_{csclamp}$. As the output voltage increases, the output current is reduced to maintain the composite signal constant (negative slope of the V-A characteristics). At the same time, the clamp currents are reduced and at one point the output current has to increase to satisfy demands of the error amplifier (positive slope or the foldback region of the V-A curves). This is explained further herein.

Thus, in voltage mode 102, the first voltage mode 102 slope 102 is a negative slope that corresponds to a condition where the power needs of the load 712 are generally lower. In at least some embodiments, this slope 102 can be either negative or nearly zero. In at least some embodiments, for example, a slightly negative slope 102 allows the ability to share current between parallel-connected converters This first voltage mode covers conditions between zero load (at point 160, at $V_{NL}$, $I_{NL}$) to full load (at point 162, $V_{TH1}$, $I_{TH1}$). In between point 160 and point 162, so long as the output current $I_{out}$ is between 0 and the first threshold $I_{TH1}$, and so long as the output voltage $V_{out}$ is between the no load voltage $V_{NL}$ and the first voltage threshold $V_{TH1}$, as shown in FIG. 6, then voltage mode control 706 is activated (blocks 835 and 840). In at least some embodiments, the voltage mode 102 can comprise a substantially constant output voltage out of power converter 710 (e.g., a slope that is close to zero between point 162). In one embodiment, during voltage mode 102, there amount of "voltage droop" (i.e., the intentional drop in output voltage as a voltage source drives a load) advantageously is less than 10% of the no load voltage ($V_{NL}$) output from the voltage source. In one exemplary embodiment, $V_{NL}$ is about 315 VDC and $V_{TH1}$ is about 90% of the VNL voltage (in this case, about 284 VDC). These numbers are not, of course, limiting. As noted elsewhere, at least some embodiments described herein are applicable to voltage sources that provide 1000 VDC.

While the controller 702 is controlling the power converter 710, via voltage control 706, to be in voltage mode 102, the controller is also monitoring (at least periodically) (block 820) the output voltage out of the power converter 710, via a signal from the output voltage sense 714 which is fed back to the voltage control block 706, the power control block 708, and, optionally, the foldback control block 750. When the output voltage feedback signal 755 coming to the voltage loop control 706 drops below $V_{TH1}$, (block 835) which corresponds to an increased load 712 (e.g., additional equipment requiring power 724 is coupled to the power distribution system 712), then the converter goes into the first power mode 104, in which controller 702 shifts control of the power converter 710 to a power loop control block 708, which attempts to maintain nearly constant power at the output of the power converter 710. The power control 708 controls the power converter 710 enabling the power converter 710 to adjust output voltage $V_{OUT}$ and output current $I_{OUT}$ to provide a substantially constant output power as shown by the constant and linear power slope shown in the first power mode of FIG. 6. This is useful for power delivered to heavy and pulse loads, such as radar systems, large banks of data servers, and other high voltage DC systems, as described herein. In addition, those of skill in the art will appreciate that other types of constant power mode are possible in this first power mode 104, as detailed in the incorporated by reference '283 patent.

Thus, the first threshold point of "knee current" 162 (labeled, in FIG. 6, $V_{TH1}$, $I_{TH1}$ for the first threshold) corresponds to the start of the first power mode 104, in which the load requires significant amounts of power. This portion of the V-A slope, which has a negative slope, continues until the second "knee" point 164, occurring at the second threshold and corresponding to $V_{TH2}$, $I_{TH2}$. The second knee point 164 occurs at a predetermined current limit for the power converter 710. The output power and voltage allow a predetermined current limit to be determined. For example, in one exemplary embodiment, the predetermined current limit is set to within 110-120% of the nominal power divided by the nominal voltage. first power mode 104, in one embodiment, corresponds to a first point of an overload limit (threshold 1, labeled 162 in FIG. 6), which is a voltage limit point for the voltage mode 102 portion of the V-A curve. The second knee point 164 corresponds to both a current limit point (threshold 2, labeled 164 in FIG. 6) and the end of the power mode 104.

During power mode 104, the power converter 710 is able to supply a continuous level of output power up to this current limit point, which in FIG. 6 corresponds to the second threshold (i.e., knee #2), at point 164. For example, a current limit point in some systems is predetermined to be 10 to 20% over maximum rated current. During this first power mode 104, the power converter/system is controlled, via power control 708, to provide substantially constant output power, up to its current limit point 164. However, beyond the overload point 162, there is a first reduction in voltage during power mode 104, from $V_{TH1}$ to $V_{TH2}$. This voltage reduction avoids overloading the power converter 710 and damaging the load.

Figure 1:
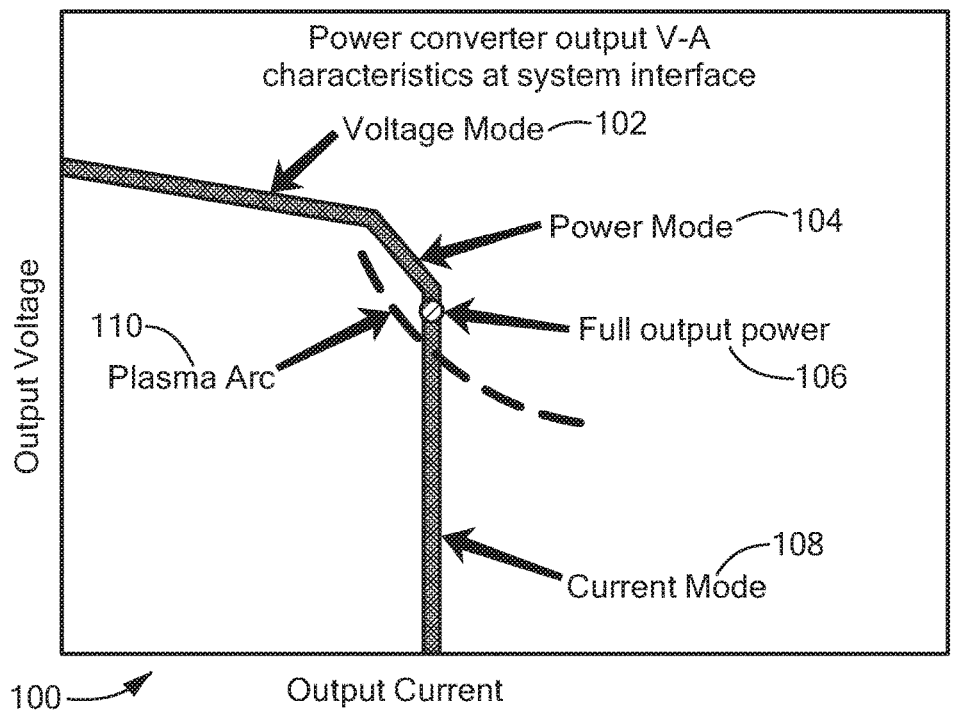
FIG. 1 is a first graph showing exemplary prior art power converter volt-ampere (V-A) characteristics at a system interface.
Figure 2:
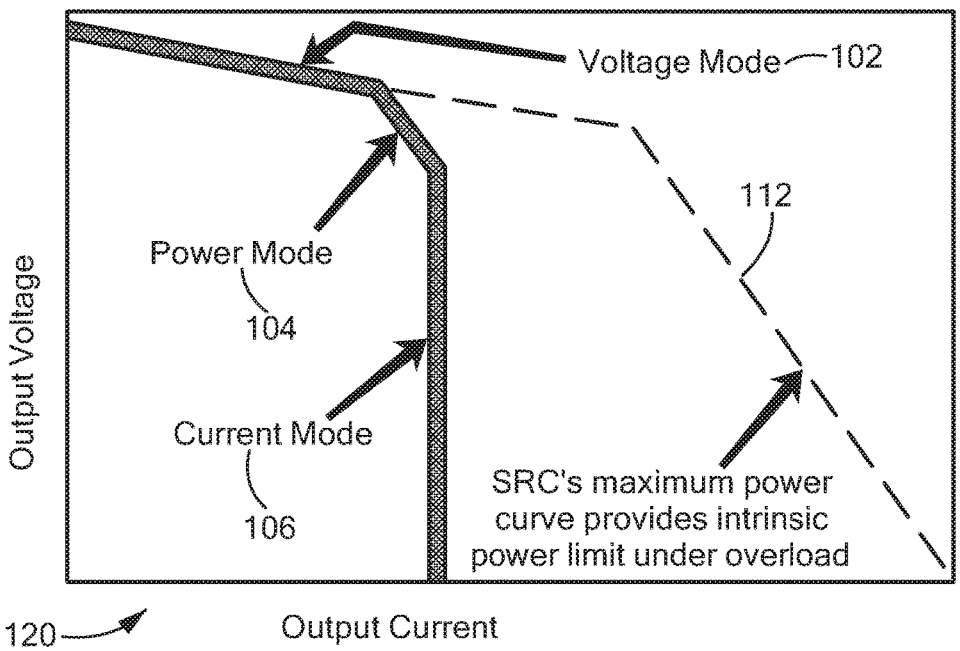
FIG. 2 is a second graph showing output V-A characteristics of an exemplary prior art series resonant converter (SRC) type of power converter.

In prior art power converter systems, such as that of the aforementioned '283 patent, and as illustrated in FIGS. 1-3, when the power converter reaches its "knee" current threshold corresponding to maximum output current, the converter was controlled to be in a current mode, providing a substantially constant current output. However, for very high voltage systems, as noted previously, this increases the dangerousness of arc flashes, with the possibility of arc flashes occurring at full output power. Conventional foldback is employed in linear power supplies (e.g., medium voltage supplies) because it reduces the strain on the supply's internal power devices to minimum. However, as noted herein, one drawback of conventional foldback current limiting is that if the supply turns on into a heavy capacitive load, it could latch-up (short) at a reduced current before reaching its full output voltage. The shorts are less dangerous with lower voltage power systems, but with high voltage power systems (including systems running between 300-1000 VDC), the latch-up could result in dangerous arc flashes.

Thus, the foldback mode 114, as shown in FIG. 6, in combination with the second power mode 150 (also referred to as current mode 150 and/or fold forward mode 150), is used to help reduce output power. The foldback mode 114 reduces power that could be delivered to a fault (e.g., a short circuit fault), and goes from the current limit of the power converter/system (point 164 in FIG. 6) to its charge limit (point 166 in FIG. 6), in a positive slope. Advantageously, in at least one embodiment, at least one of the current limit point 164 and/or charge limit point 166 are dynamically determined and adaptively controlled based at least in part on continuously sensing output current, output voltage, and/or an overload/feedback signal, from the power converter/system. For example, U.S. Pat. Nos. 7,839,201 and 8,076,967, both entitled "Integrated Smart Power Switch" and both hereby incorporated by reference, describe principles of power systems that include adaptive control features, and it will be appreciated that the principles described in these patents can be adapted to provide adaptive controls to at least some of the embodiments described herein. For example, in one embodiment, a system can be configured to include adaptive control capable of dynamically adjusting one or more output characteristics, including threshold points. This is explained further herein.

Figure 13A:
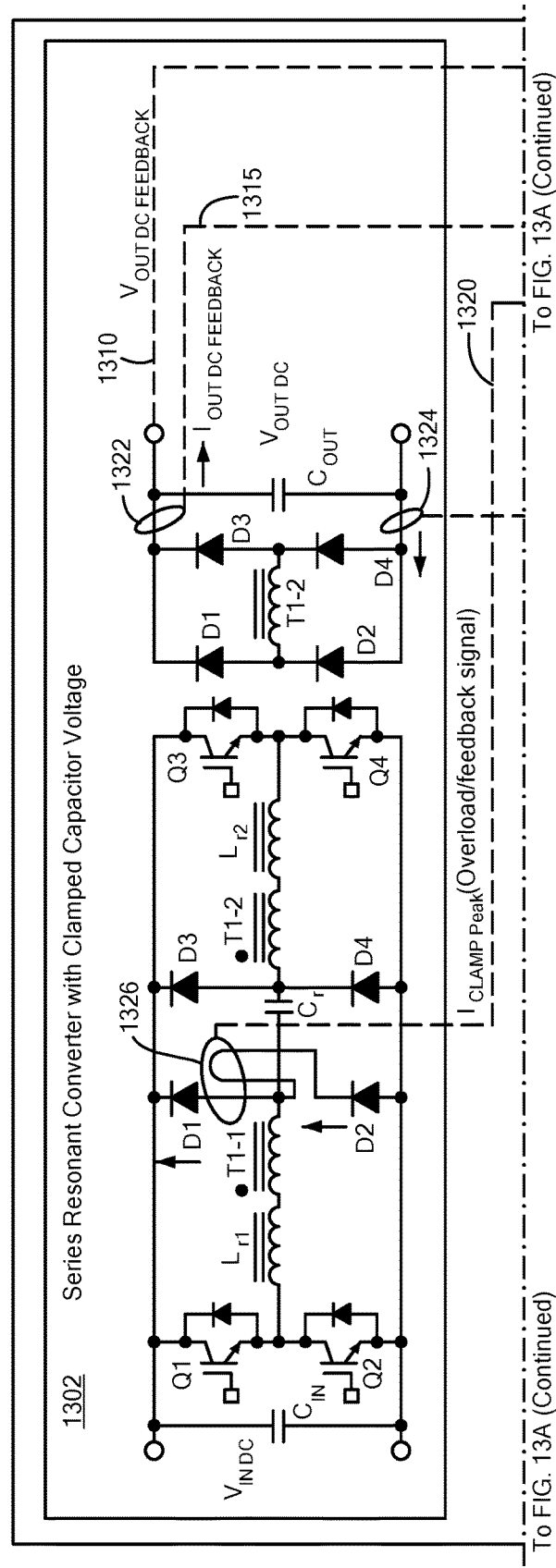
FIG. 13A is a first diagram showing a second embodiment of an SRC implemented to operate using the foldback and quad slope characteristics of FIG. 6, with three foldback loops, in accordance with a seventh disclosed embodiment.
Figure 13A:
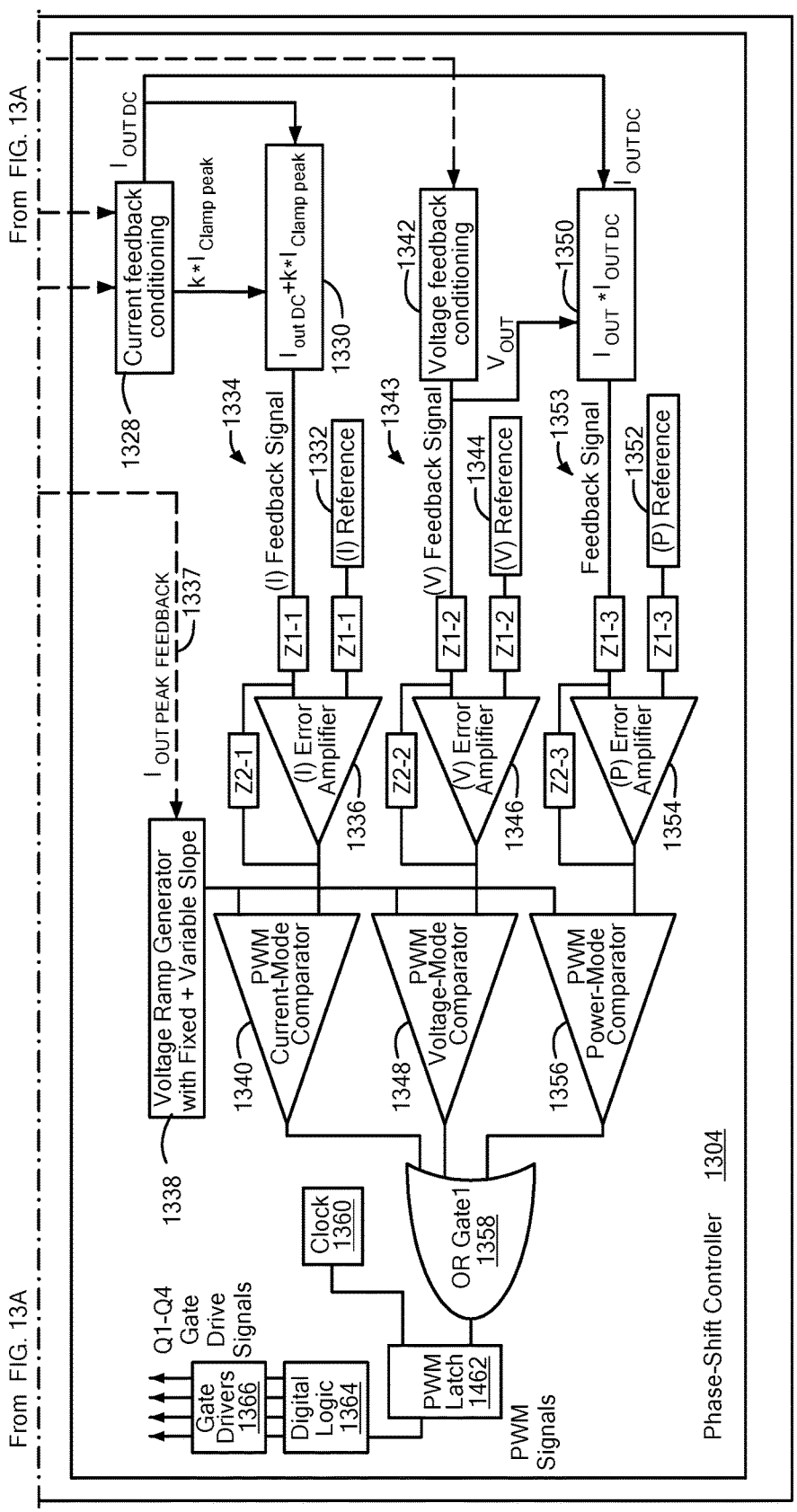
Figure 13B:
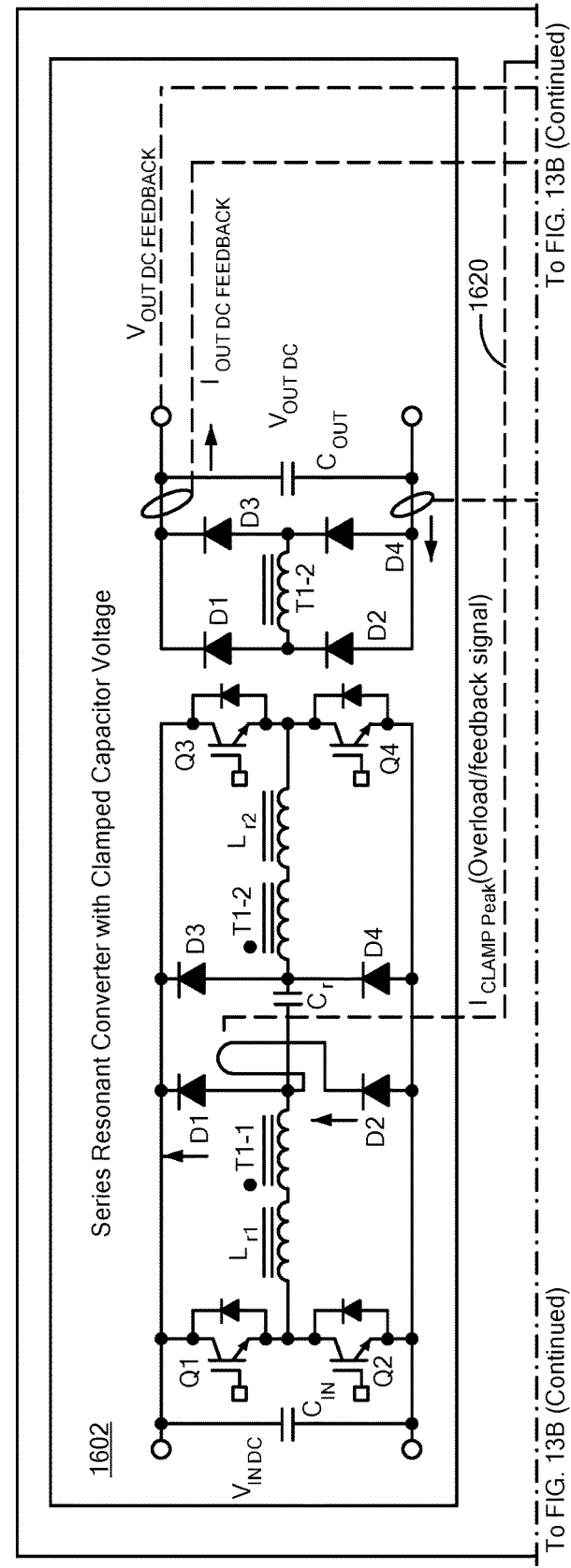
FIG. 13B is a second diagram showing a third embodiment of an SRC implemented to operate using the foldback and quad slope characteristics of FIG. 6, with four foldback loops, in accordance with a seventh disclosed embodiment.
Figure 13B:
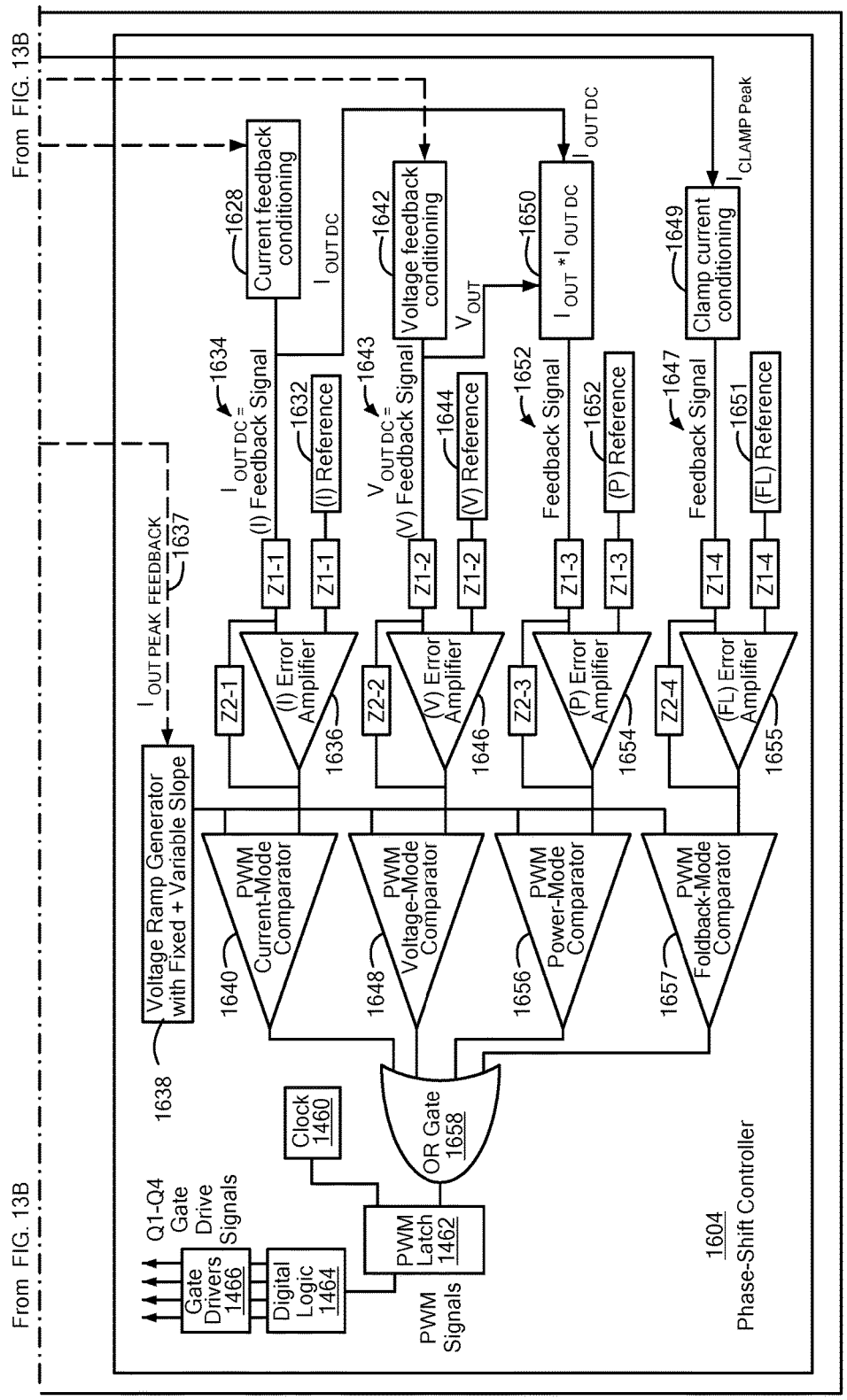

Accordingly, referring still to FIGS. 6-8, when the output voltage and output current reach the second "knee" current threshold 164, which is detected by monitoring the $V_{OUT}$ DC feedback signal 755 (block 855), then the power converter 710 is controlled by controller 702 to go into foldback mode 114 (block 860), in which output current is controlled to be less than $I_{TH2}$ (maximum current limit, which can be the maximum current limit of the power converter 710 or some other maximum current limit, which can be predetermined or dynamically determined) and greater than $I_{TH3}$, which is the charge limit point 166. Note that FIG. 7 shows three feedback loops and an "optional" fourth feedback loop (the foldback control 750). The waveforms of FIG. 10A correspond to a three loop implementation of providing the four modes of FIG. 6 (i.e., not using the optional foldback control loop 750 of FIG. 7), e.g., as shown in FIG. 13A, but at least one embodiment also shows a four loop implementation of providing the four modes of FIG. 6, e.g., as shown in FIG. 13B and in the waveforms of FIG. 10B.

This control of foldback mode 114, in one embodiment, is based at least in part on the values of the $V_{OUT}$ DC feedback signal 755, the $I_{OUT}$ DC feedback signal 760, and the $I_{OVERLOAD}$ DC feedback signal 765, as well as (for SRC circuits), the resonant current sense signal (e.g., see the signal labeled 1320 in FIG. 13A, discussed further herein), where the $I_{OVERLOAD}$ DC feedback signal 765 corresponds to a signal from overload protection circuitry in the power converter 710, such as clamping diodes, that provides an indication of overload and/or fault conditions. Thus, in some embodiments, the combination of current loop control 704, voltage loop control 706, and power loop control 708, are responsive to the voltage output feedback signal 755, the current output feedback signal 760, and a sensed current output from clamp diodes 764 (or other current limit circuits), are used to control foldback mode 114. In some embodiments, an additional foldback loop control block 750 is responsive to the voltage output feedback signal 744 and the current output feedback signal 760, to control foldback mode 114. This is shown, in one embodiment, in FIG. 13B, which is a block diagram showing the additional foldback loop, where the added foldback loop uses information only from the clamping diodes' current sense. As will be appreciated, the operation of the system shown in FIG. 13B is substantially similar to that of FIG. 13A, except for the addition of the added on foldback loop, which is, in FIG. 13B, the loop where $I_{CLAMP,Peak}$ is routed through the clamp current conditioning block 1649 to become feedback signal 1647, which is compared to a predetermined foldback loop (FL) reference signal 1651, via FL Error Amplifier 1655, where the difference is then provided to the PWM Foldback-Mode Comparator 1657, which outputs its signal to OR gate 1658, to be routed, as applicable back as an appropriate gate drive signal, as will be appreciated. In the example embodiment of FIG. 13B, the added on foldback loop uses only the clamping diodes' current sense (e.g., $I_{CLAMP,peak}$ 1320, which is routed to clamp current conditioning block 1649). It will be appreciated that there are other ways to implement control of foldback, as well.

Referring still to FIGS. 6-8, and the example of a triple loop embodiment, at the current limit point 164 (start of foldback mode 114) (block 855), the power converter/system is controlled so that there is reduction in both voltage and current (foldback mode 114) until the output voltage reaches the foldback mode 114 threshold point 166 (corresponding to $V_{TH3}$, $I_{TH3}$.) (blocks 855-865). In one embodiment, an optimum value of the foldback mode 114 threshold point 166 is selected based at least in part on system and load-specific considerations. For example, for enhanced safety, the threshold point 166 can be selected to be lower in value. In contrast, for improved ability to operate with capacitive or battery loads, the threshold 166 may be selected to be higher. It may be desirable to avoid threshold points at extremes. For example, in one embodiment, consider a foldback mode threshold point 166 is selected to be relatively close to the first threshold point near the end of the power mode. In this example, the converter will start with any capacitive load, but will deliver excessive current into a dead short. In another embodiment, consider a foldback mode threshold point 166 that is selected to be close to zero voltage. In this example, the converter will reduce the overload power, but will not be able to start when the load is capacitive.

Figure 9:
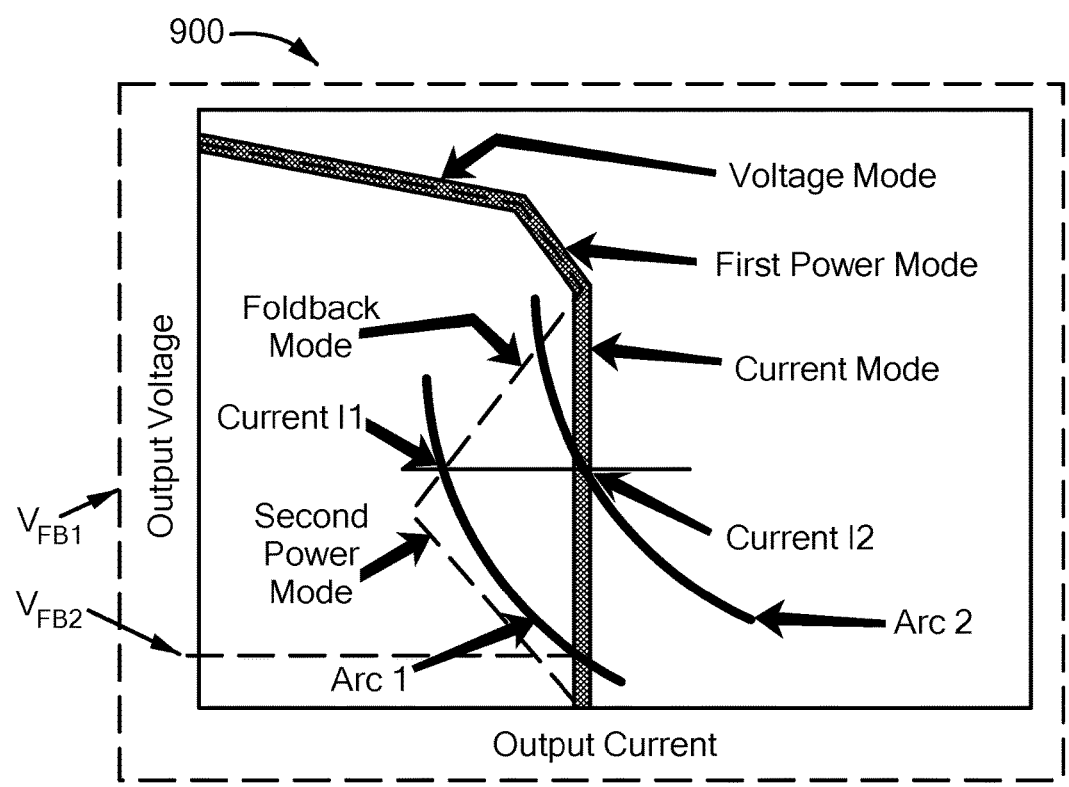
FIG. 9 is a first exemplary graph showing reduction in power delivered to an arc fault, in accordance with a fourth disclosed embodiment.

During foldback mode, the controller 702 controls the power converter to reduce output power by reducing output voltage and output current. Foldback mode 114 is useful if an overload condition exists, by controlling the power converter 710 output voltage and output current so that they reduce to safe levels (levels that reduce possibility of dangerous arc flash and that reduce possibility of damage to power converter 710 or other power system 700 components). As FIG. 6, shows, should an overload occur the supply will provide current up its current limit point (aka 'knee') 164, and then the output current will fold-back to a lower value as the output voltage reduces towards the second threshold point 166. This is shown in greater detail in FIG. 9, which is a first exemplary graph 900 showing reduction in power delivered to an arc fault, in accordance with a fourth disclosed embodiment, using the embodiments of FIGS. 6-8, with the quad slope configuration. Referring briefly to FIG. 9, the Arc 2 110c crosses the theoretical line of the constant current at a first output voltage $V_{out, Arc2}$, $I_{out, Arc2}$. As can be seen in FIG. 9, because the output voltage is reduced for both Arc 1 and Arc 2, the possibility of dangerous arc flashes is significantly reduced as compared to just foldback alone, because Arc 1 and Arc 2 occur at greatly reduced power levels.

Unlike in the foldback configuration of FIG. 3 or as described in the '283 patent, the output voltage in power converter 710 is not permitted to drop all the way to zero while still reducing output current. Rather, in accordance with at least some embodiments described herein, including those in FIGS. 6-8, once output voltage drops to $V_{TH3}$, the charge limit, and output current has dropped to $I_{TH3}$, the power converter 710 is controlled to recognize that its output power has, by point 166, dropped to a level that would reduce the probability of a dangerous arc flash.

Referring still to FIGS. 6-8, at the charge limit point 166 (i.e., the point where initial charging of a capacitive load is finished), at where voltage is at $V_{TH3}$ and current is at $I_{TH3}$, the power converter/system is controlled to go into a second power mode 150 (also referred to herein as a current mode 150 or fold-forward mode 150). This second power mode 150 has negative slope, permitting increased output current while output voltage continues to decrease (blocks 870, 875) where output current is increased, as output voltage decreases, up to the fourth threshold, which corresponds to zero output voltage, at point 180 ($V_{TH4}$, $I_{TH4}$). The second power mode 150/current mode 150 provides increased current at low voltage and low power, to enable initial charge-up of capacitive loads (e.g., the energy storage devices 726, which are, in some embodiments, batteries or banks of capacitors, etc.). The fold-forward mode 150 (also called second power mode 150) is controlled at least in part by the current loop control 704 (in the three loop configuration), because the feedback signal of the current loop control 704 combines the DC current (i.e., $I_{OUT\ DC\ feedback}$ 760) and the overload sense current 765 power loop control 708. In addition, by controlling the power converter 710 so that its output voltage reduces towards zero, while its current increases (blocks 870, 875, 880), this "fold-forward" current feature can be useful when driving motors, pumps, or highly capacitive loads, by helping to overcome the electrical inertia of these loads. Once the load reaches its steady state condition (or is removed or disconnected), the power converter 710 can be controlled to recover from the second power mode 150.

Figure 10A:
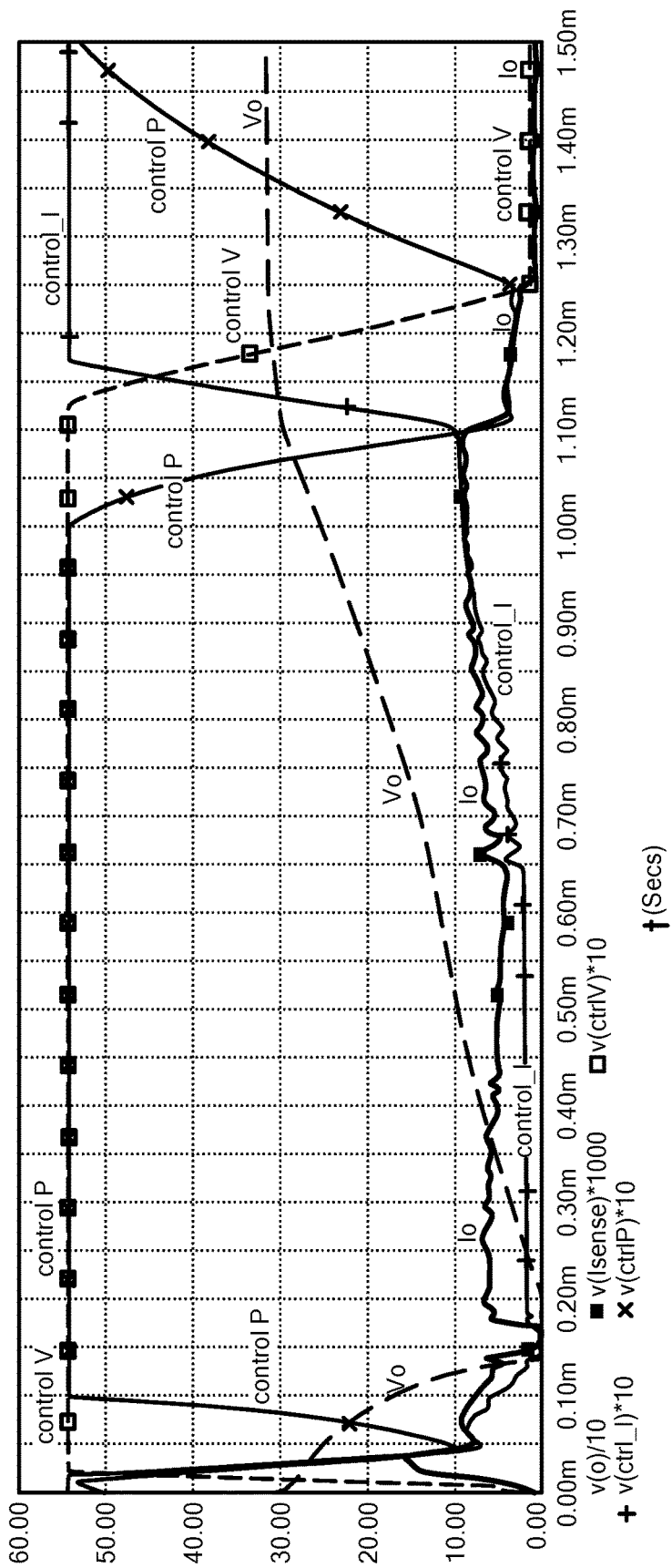
FIG. 10A is a first graph of a simulated waveform for a power converter system having a constant current periodic pulsed load, and three control loops, in accordance with a fifth disclosed embodiment.

FIG. 10A is a first graph of a simulated waveform for a power converter system having a constant current periodic pulsed load and three control loops (i.e., the current control loop 704, the voltage control loop 706, and the power control loop 708 of FIG. 7). The foldback mode is implemented by the current control loop 704, of FIG. 7 in accordance with a fifth disclosed embodiment. FIG. 10A shows not only the values of the output voltage and current over time, but also the values of the sensed current, and the control signals for power, voltage, and current.

Figure 10B:
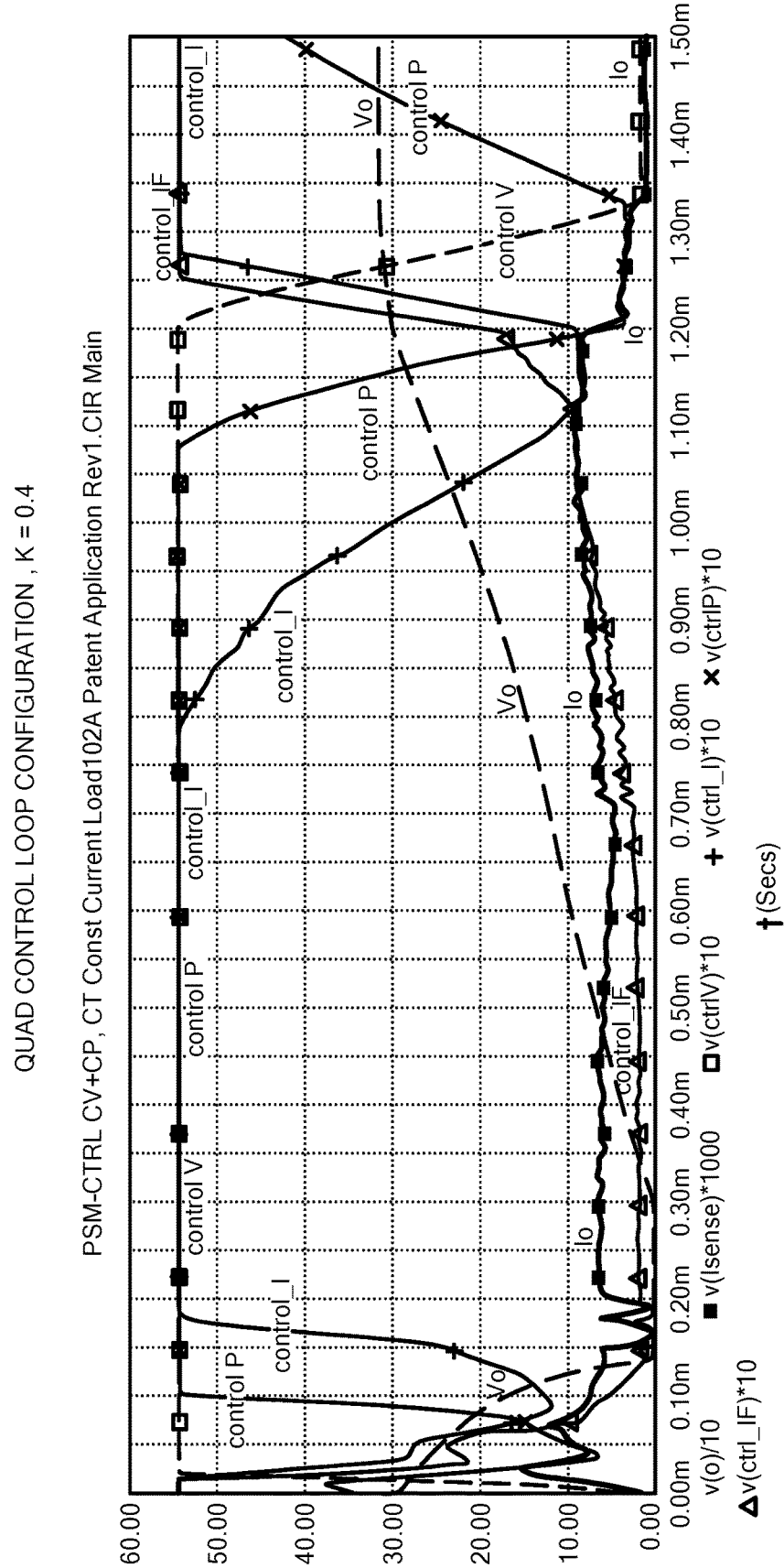
FIG. 10B is a second graph of a simulated waveform for a power converter system having a constant current periodic pulsed load, and four control loops, in accordance with a sixth disclosed embodiment.

FIG. 10B is a second graph of a simulated waveform for a power converter system having a constant current periodic pulsed load, and four control loops, in accordance with a sixth disclosed embodiment. In one embodiment, the graph of FIG. 10B corresponds to the system 700 of FIG. 7, but including the optional foldback control loop 750. FIG. 10B, like FIG. 10A, shows not only the values of the output voltage and current over time, but also the values of the sensed current, and the control signals for power, voltage, and current.

Figure 11:
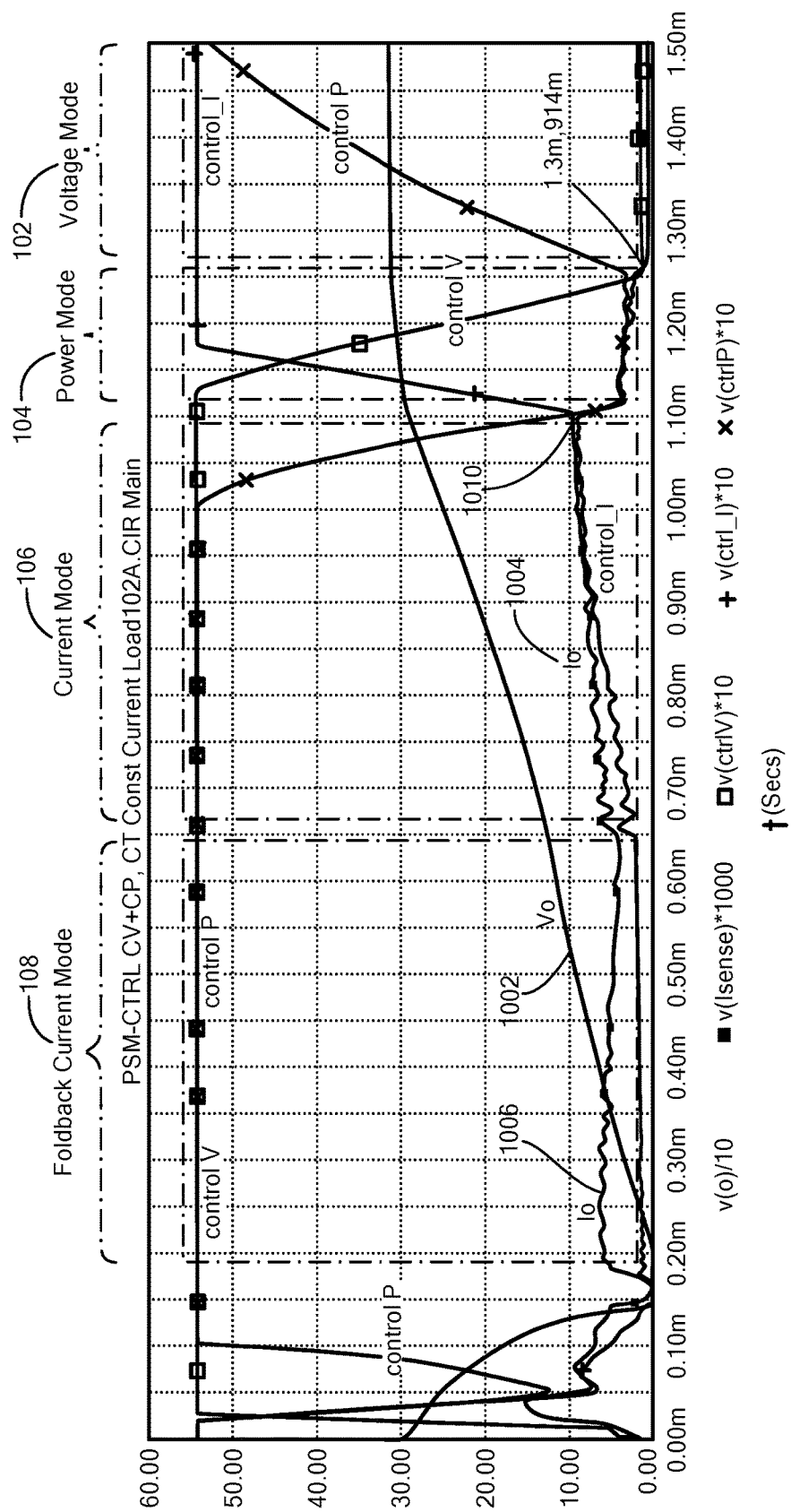
FIG. 11 is a graph similar to that of FIG. 10A, showing foldback mode, current mode, power mode, and voltage mode, overlaid thereon, for a method of controlling the power converter.

FIG. 11 is a graph similar to that of FIG. 10A, showing foldback mode, current mode, power mode, and voltage mode, overlaid thereon onto the graph of FIG. 10A. FIG. 11 shows a simulation using a system that implements a triple control loop, quad slope foldback (e.g., as in FIG. 6). As a comparison of FIG. 10A and FIG. 11 shows, the quad slope configuration provides foldback benefits, in addition (as noted elsewhere herein) to having the fourth slope in the lower voltage regions, to allow converters with capacitive loads to start up.

Referring to FIGS. 10A, 10B and 11, in the simulated version of system of FIG. 7 (advantageously, the triple loop/three control loop version), the output voltage $V_O$ 1002 is at its largest, substantially constant value in voltage mode 102. In this graph, the output current is set for a constant current periodic pulsed load. When the system is in power mode 104, the output voltage $V_0$ is controlled, and decreases slightly while maintaining constant power, until the sensed current 1006 indicates, at point 1010 in FIG. 11, that a potential short or overload condition is reached. From point 1010 onward, towards the right of the graph of FIG. 11, the output voltage $V_0$ decreases towards zero.

Reference is now made briefly to the three or four control loop embodiment of FIGS. 7, 13A, and 13B. In the block diagram 700 of FIG. 7, the controller 702 has three or four "channels. This corresponds, in the three control loop embodiment of FIG. 13A, to the controller 1304, and in the four control loop embodiment of FIG. 13B to the controller 1604. Each respective channel comprises an error amplifier (e.g., error amplifiers 1336, 1346, and 1354 of FIG. 13A and error amplifiers 1636, 1646, 1654, and 1655 of FIG. 13B) with appropriate compensation circuits (impedances Z1-X and Z2-X, where X corresponds to the loop number), feedback conditioning (e.g., in FIG. 13A, the current feedback conditioning block 1328 and voltage feedback conditioning block 1342; in FIG. 13B, the current feedback conditioning block 1628, voltage feedback conditioning block 1642, and clamped current conditioning block 1648), as well as processing networks (as appropriate for each channel) and a respective PWM comparator (In FIG. 13A, these are the PWM current mode capacitor 1340, PWM voltage mode comparator 1348, and PWM power mode comparator 1356; in FIG. 13B, these are PWM current mode capacitor 1640, PWM voltage mode comparator 1648, and PWM power mode comparator 1656, and PWM foldback-mode comparator 1656).

The outputs of the comparators are connected to an OR gate (e.g., OR gate 1358 on FIG. 13A, OR gate 1658 in FIG. 13B). For each channel, one input of each comparator is connected to the channel's error amplifier; another input is connected to a ramp generator (e.g., ramp generator 1338 of FIG. 13A, ramp generator 1638 of FIG. 13B) common to all channels. The comparator with the lowest input signal from its respective error amplifier controls the pulse width at the output of the OR gate.

Referring briefly to the waveforms of FIG. 11 which correspond to a converter with a pulsed load and capacitive energy storage, at time 0, voltage control signal ctrlV is low, other signals ctrlP and ctrl_I are high, and $V_O$ is at its initial value (approximately 300 V). This corresponds to the nominal output voltage and zero current. When a pulsed load is applied that exceeds the rated power of the converter, the output voltage drops and after approximately 0.05 millisecond (ms) the current loop driven by the sum of the output current and the overload current sense is in control. From 0.2 to 0.65 ms., the converter is in foldback mode. From 0.65 to 1.1 ms., the converter is in the constant current mode. At the end of this interval (from 1 to 1.1 ms.) the converter voltage and current are high enough to enable to power control signal ctrlP to move down, as shown in FIG. 11. From 1.1 to 1.25 ms this signal (power control signal ctrlP) is low, and the power loop controls the converter (i.e., converter is in Power Mode). At the end of the interval, the voltage control signal comes down and assumes control (i.e., converter is in Voltage Mode) because the output voltage ($V_O$) is restored to its initial value.

Figure 12:
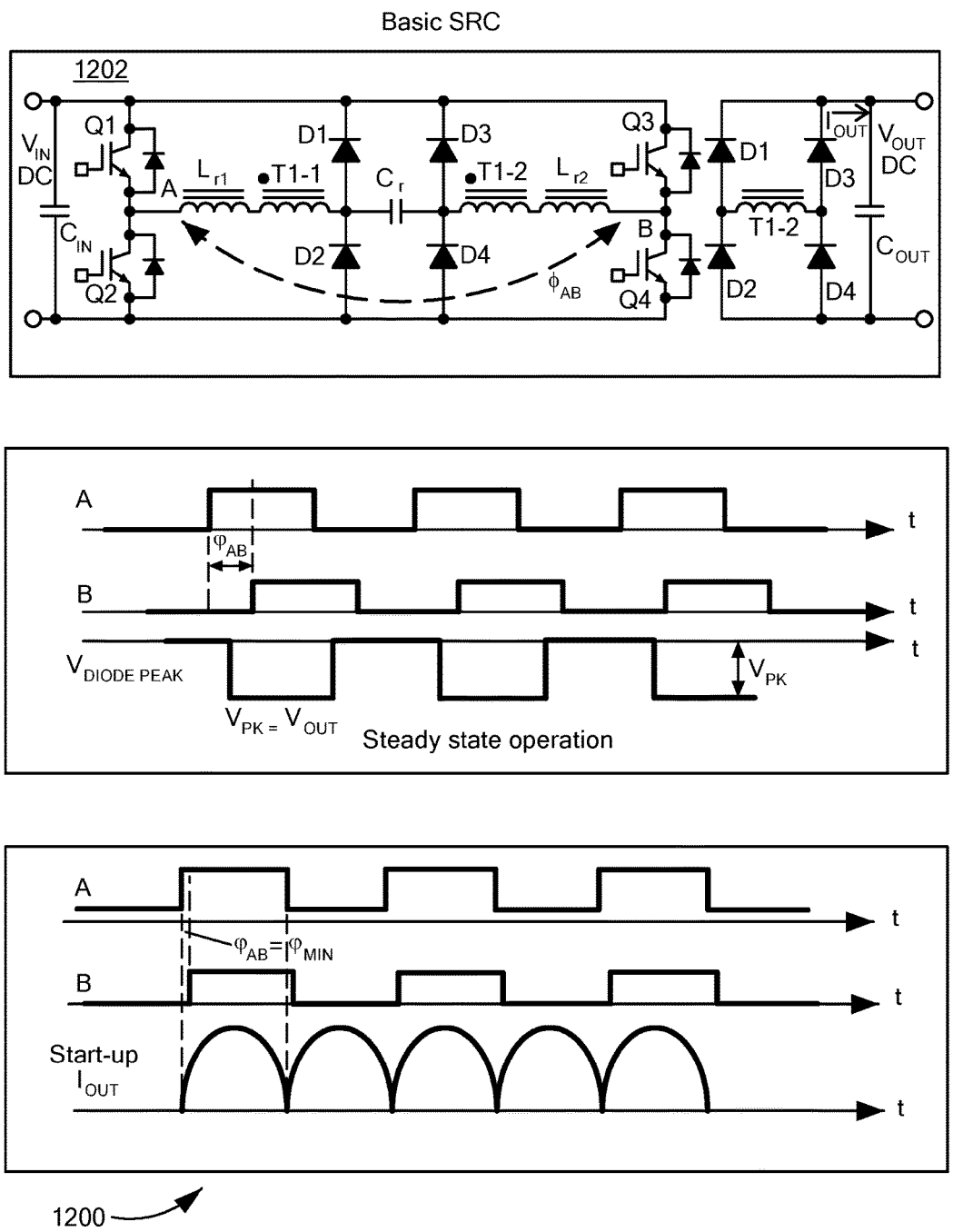
FIG. 12 is a diagram showing a first embodiment of an SRC, and its output waveforms, which is usable for operating using the foldback and quad slope characteristics of FIG. 6, control system of FIG. 7, and method of FIG. 8, in accordance with a sixth disclosed embodiment.

In another disclosed embodiment, the quad slope V-A characteristics of FIG. 6, and the system 700 of FIG. 7, and the control method 800 of FIG. 8, are applied to a power converter 710 implemented using a series resonant converter (see FIG. 12). Referring to FIG. 12, a basic SRC circuit that is usable for this purpose is shown.

Referring to FIG. 12, the basic SRC 1202 does not need an output DC inductor. The SRC 1202 has, in one embodiment, output rectifiers with voltage rating of less than twice the output. Thus, output current may build-up in one switching cycle enabling fast dynamic response (e.g. changing direction of power flow). The SRC 1202 has, in one embodiment, soft-switched operation with high switching frequency and high efficiency. The SRC absorbs circuit parasitics (leakage inductance, transformer capacitance, etc.) into main circuit elements, and the SRC can be manufactured consistently with low cost components and processes.

FIG. 13A is a first diagram showing a second embodiment of an SRC implemented to operate using the foldback and quad slope characteristics of FIG. 6, with three foldback loops, in accordance with a seventh disclosed embodiment. In particular, FIG. 13A shows a second embodiment of an SRC 1302 and its phase shift controller 1304, which are generally, similar to the SRC of FIG. 12. The SRC 1302 is configured to operate using the foldback and quad slope characteristics of FIG. 6 and a control similar to that of FIG. 7, in accordance with a seventh disclosed embodiment. FIG. 13A provides a three-loop controller (including current loop control via PWM current mode comparator 1340 path), voltage mode control (including voltage loop control via PWM voltage mode comparator 1348 path) and power mode control (including power loop control via PWM power mode comparator 1354 path), wherein the control of the SRC 1302 is implemented in accordance with at least some of the disclosure herein. This three-loop controller 1304 is able to implement a quad-slope configuration, and does not require a fourth loop (i.e., the foldback control loop 150 of FIG. 7), because it makes use of sampling the clamped diode currents (e.g., by using $I_{clamp}$, peak 1320) and providing it to the current mode comparator 1340 path. (Note, also that in at least some embodiments, as shown in FIG. 13B, it is possible to implement an SRC that operates using the foldback and quad slope characteristics of FIG. 6, with four foldback loops,).

Referring again to FIG. 13A, compared to the basic SRC controller of FIG. 12, in the three-loop controller, the voltage and power loops remain unchanged. The current loop is modified by adding a fraction of the clamped diodes' currents to the output current (see current feedback conditioning block 1328 and the summing block 1330 of FIG. 13, where the fraction of $I_{clamp}$ is a function of a predetermined constant k. In at least some embodiments, k ranges from 0.5 to 1/1.5. As will be appreciated, the value of k is application specific. For example, higher values of k increase the weight of the overload current in the overall feedback signal. A higher feedback signal reduces the output current. Lower values of k reduce the overall feedback signal. Basing current control on both sensed output current and sensed clamped current helps to better control current output by helping to detect potential overcurrent conditions and/or short circuits (via the measurement of clamped current).

Figure 14:
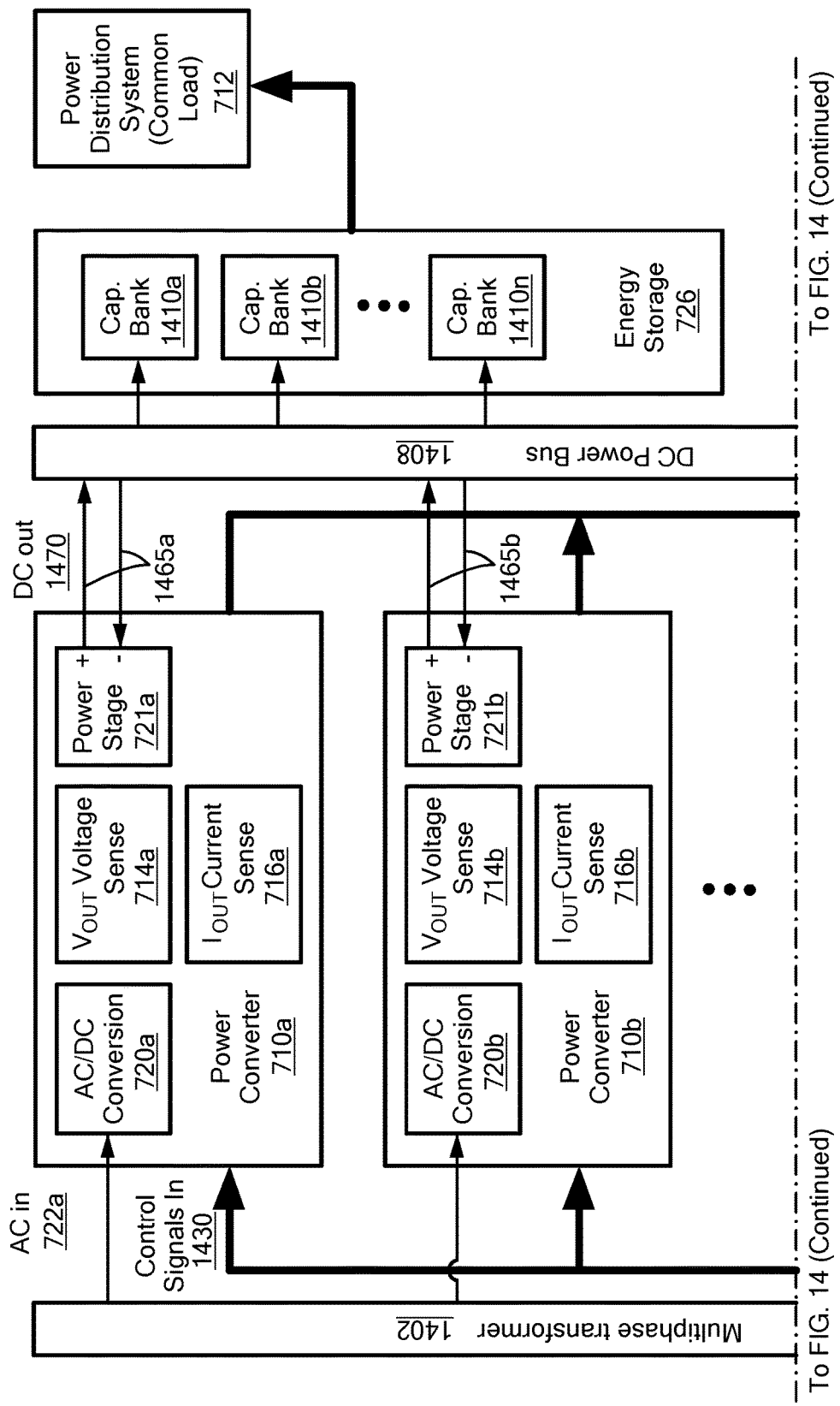
FIG. 14 is a system block diagram of a power system comprising multiple power converters connected in parallel and feeding a common load, in accordance with an eighth disclosed embodiment.
Figure 14:
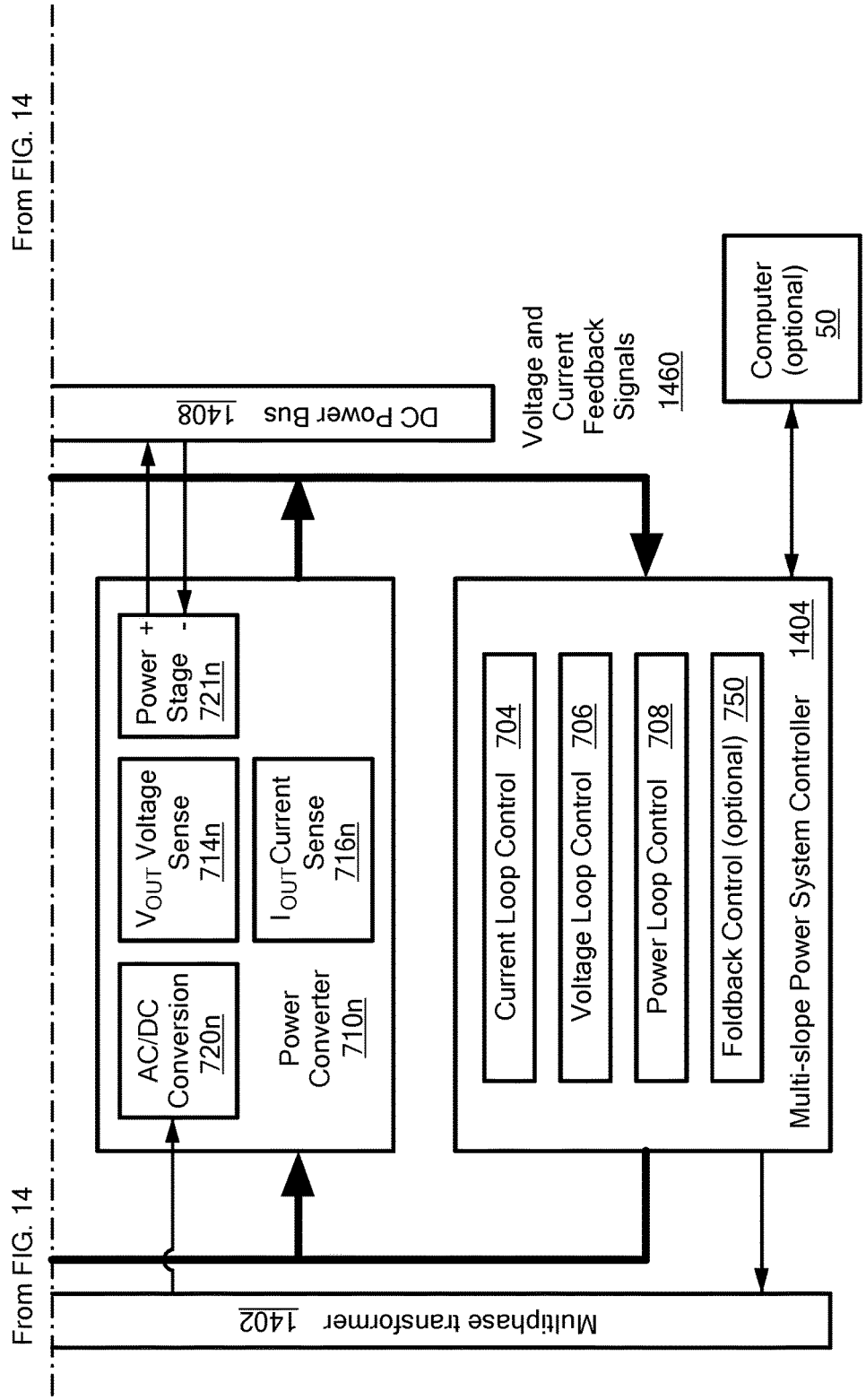

The power converter and controller system of FIG. 7 is adapted, in one embodiment, to form a power system comprising multiple converters. For example, FIG. 14 is a system block diagram of a power system 1400 comprising multiple power converters 710a through 710n (which are functionally similar to the power converter 710 of FIG. 7) connected in parallel, under the control of a power system controller 1404 (which is functionally similar to the controller 702 of FIG. 7), in accordance with an eighth embodiment. The plurality of power converters 710a-710n each are configured to provide DC output to a power bus 1408 that feeds a plurality of capacitor banks 1410a through 1410n (or other energy storage devices), where at least a portion of the capacitor banks 1410 are operably coupled to a common load, which in this example is a power distribution system 712. Each respective power converter 710 is configured and controlled, via the power controller 702, to be able to provide multi-slope (e.g., quad slope) Volt-Amp (V-A) output, in a manner similar to that discussed in connection with the power converter of FIG. 7.

As is understood in the art, the plurality of power converters 710a-710n are operably coupled in parallel between the multiphase transformer 1402 and the DC power bus 1408, where the DC power bus is in operable communication with respective pair of conductor lines 1465 from each power converter 710. In at least one embodiment, the DC power bus 1408 is configured to provide a high output voltage, up to 1000 VDC, depending on the needs of the common load 712. In addition, as will be appreciated, for simplicity, the power system 1400 does not show all components that might be necessary or useful in such a system, including but not limited to such as shielding, filters, signal conditioners, grounding, etc.

The plurality of power converters 710a-710n provide to the power controller 702 current and/or voltage feedback signals 1460, appropriate during the mode of operation (e.g., voltage mode, first power mode, foldback mode, second power mode, etc., as discussed previously in connection with FIG. 7) that are based on sensed output current and output voltage out of the respective power converter 710. Based on the values of the current and/or voltage feedback signals 1360, the power controller 702 provides control signals 1430 to one or more of the plurality of power converters 710a-710n to control their respective output voltages and/or output currents, as appropriate, to control the operation of the respective power converter 710 as needed during the mode of operation. Optionally, one or more computer systems 50 are in operable communication with the power controller 702, to help perform one or more of its functions. It will be appreciated, however, that a computer system 50 is not necessary for all embodiments, and that the power system 1400 can be configured to operate using entirely analog circuits, entirely digital logic circuits, various custom power control devices, combinations of these, etc. In addition, it will be appreciated that the common load can be any type of system that requires power, including radar systems, industrial systems, military systems, data centers, telecommunications centers, etc.

In the example embodiment of FIG. 14, a multiphase transformer 1402 provides alternating current (AC) input to the plurality of power converters 710a through 710n. An example of a multiphase transformer which is suitable for use as the multiphase transformer 105 is disclosed in U.S. Pat. No. 6,424,552, the teachings of which are hereby incorporated by reference in their entirety. The disclosed embodiments are not, however, limited to this transformer. The use of other types of multiphase transformers is considered to be within the scope of the disclosed embodiments.

One or more embodiments of the invention could be adapted to work in many different types of power systems, including but not limited to the aforementioned '283 patent, as well as in U.S. Pat. No. 8,072,093, "Intelligent Power System, issued Dec. 6, 2011 inventors Boris S. Jacobson et al., which is hereby incorporated by reference in its entirety.

As the above descriptions for FIGS. 1-14 demonstrate, at least some of the embodiments described herein provide ways to control and operate a power converter and/or power system. As noted above, any or all of the above-described embodiments can be performed using software and/or hardware, or combinations of software and hardware. In at least one embodiment, a computer system is used to help implement some or all of the embodiments described herein, especially the method of FIG. 8

Figure 15:
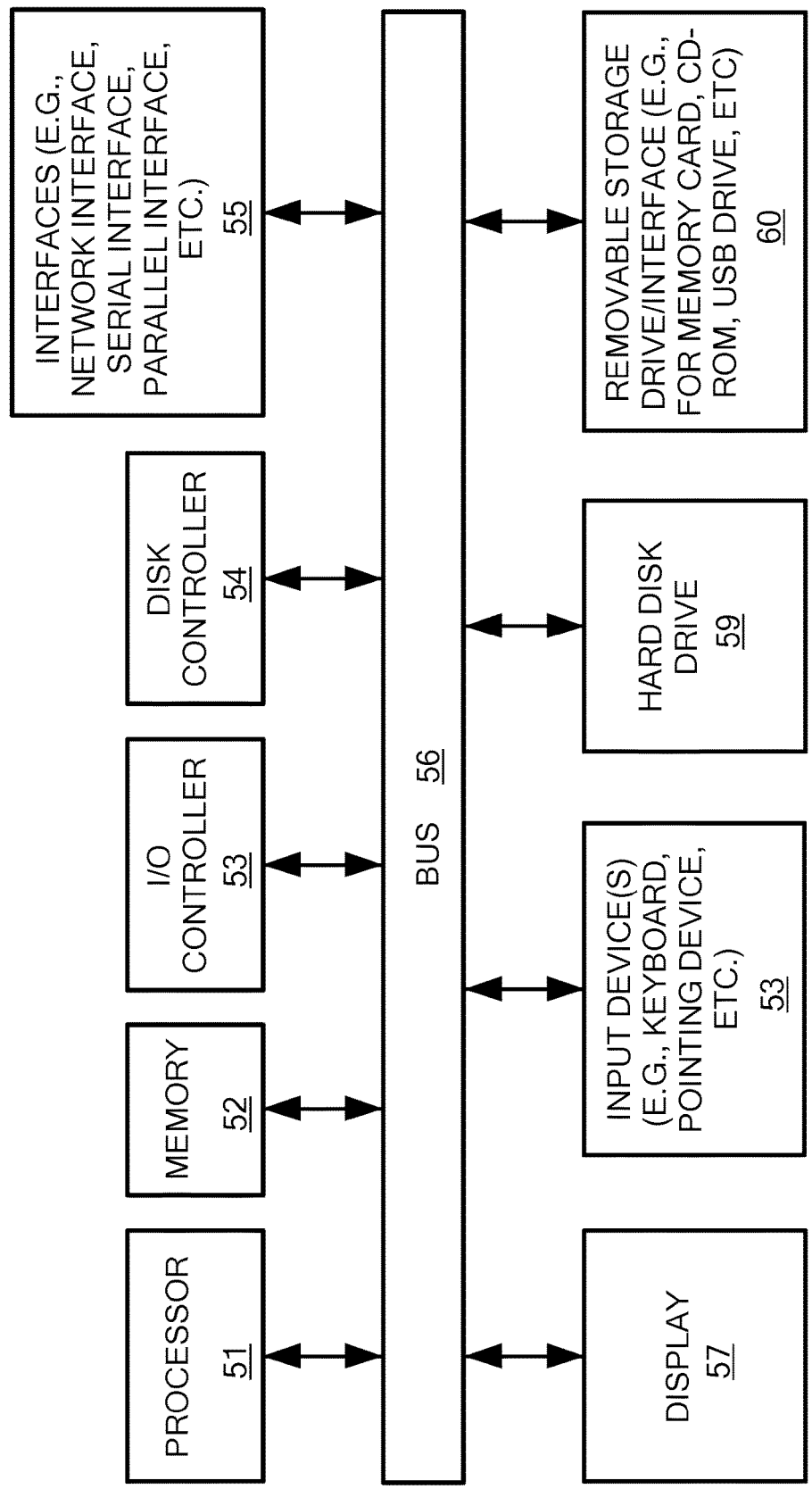
FIG. 15 is a block diagram of a computer system usable to implement the method of FIG. 8, in accordance with a ninth disclosed embodiment.

For example, FIG. 15 is a block diagram of a computer system usable with at least some embodiments, including at least the system of FIG. 7 and the method of FIG. 8, in accordance with one embodiment. FIG. 15 shows a block diagram of a computer system 50 usable for providing some or all of the functionality described herein. For example, the computer system 50 can be used to some or all of the controller 702, the power distribution system 712, as well as the method of FIG. 8, as will be appreciated. The computer system 50 also can be used to implement all or part of any of the methods, equations, function blocks, modules, algorithms, processes, and/or calculations described herein.

Referring again to the computer system 50 of FIG. 15, systems and methods in accordance with at least some embodiments can be implemented using any type of computer system running any one or more types of operating systems. Exemplary types of computer systems on which at least some embodiments can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, combination phone-tablet computer, music playing device, electronic reading device) server, workstation, and interconnected group of computers, as well as any other type of device having a microprocessor installed or embedded thereto, such as a field-programmable gate array (FPGA).

The exemplary computer system 50 of FIG. 15 includes a central processor 1, associated memory 2 for storing programs and/or data, an input/output controller 3, a disk controller 4, a network interface 5, a display device 7, one or more input devices 8, a fixed or hard disk drive unit 9, a removal storage device/drive (optional) 13, optionally a backup storage device (e.g., a tape drive unit) (not shown) and a data bus 6 coupling these components to allow communication therebetween.

The central processor 1 can be any type of microprocessor, such as a PENTIUM-family processor, made by Intel of Santa Clara, Calif. The display device 7 can be any type of display, such as a liquid crystal display (LCD), plasma display, cathode ray tube display (CRT), light emitting diode (LED), and the like, capable of displaying, in whole or in part, any desired information. The input device 8 can be any type of device capable of providing the desired inputs, such as keyboards, numeric keypads, touch screens, pointing devices, switches, styluses, and light pens. The network interface 5 can be any type of a device, card, adapter, or connector that provides the computer system 50 with network access to a computer or other device, such as a printer. For example, the network interface 5 can enables the computer system 50 to connect to a computer network such as the Internet. Other computer accessories that are now known or developed in the future (e.g., microphones, cameras, speakers, biometric access-control devices such as fingerprint scanners, etc.), although not illustrated in the block diagram of FIG. 14, can of course be included as part of the computer system 50.

Computer systems embodying at least some embodiments described herein need not include every element shown in FIG. 15, and that equivalents to each of the elements are intended to be included within the spirit and scope of the described embodiments.

In at least one embodiment, one or more computer programs define at least some of the operational capabilities of the computer system 50. These programs can be loaded into the computer system 50 in many ways, such as via the hard disk drive 9, the removable storage driver 13, or the network interface 5 (e.g., wirelessly, via the Internet, etc.). Alternatively, the programs can reside in a permanent memory portion (e.g., a read-only-memory (ROM)) chip) of the main memory 2. In another embodiment, the computer system 50 can include specially designed, dedicated, hard-wired electronic circuits that perform all functions described herein without the need for instructions from computer programs.

In at least one embodiment, the computer system 50 is networked to other devices, such as in a client-server or peer to peer system. The computer system 50 can, for example, be a client system, a server system, or a peer system. In addition, at least one embodiment is implemented at the server side and receives and responds to requests from a client, such as a reader application running on a user computer.

The client can be any entity, such as a the computer system 50, or specific components thereof (e.g., terminal, personal computer, mainframe computer, workstation, handheld device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), an Internet appliance, a telephone, an electronic reader device, or any other such device connectable to the computer network.

The server can be any entity, such as the computer system 50, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some embodiments resides in an application running on the computer system 50. At least one embodiment is embodied in a computer-readable program medium usable with the general purpose computer system 50. At least one embodiment is embodied in a data structure stored on a computer or a computer-readable program medium. At least one embodiment is embodied in an application programming interface (API) or a user interface. In addition, at least one embodiment is embodied in a data structure.

In the Figures of this application, in some instances, a plurality of system elements or method blocks may be shown as illustrative of a particular system element, and a single system element or method block may be shown as illustrative of a plurality of a particular systems elements or method blocks. It should be understood that showing a plurality of a particular element or block is not intended to imply that a system or method implemented in accordance with the invention must comprise more than one of that element or block, nor is it intended by illustrating a single element or block that the invention is limited to embodiments having only a single one of that respective elements or blocks. In addition, the total number of elements or blocks shown for a particular system element or method is not intended to be limiting; those skilled in the art can recognize that the number of a particular system element or method blocks can, in some instances, be selected to accommodate the particular user needs.

Also in the Figures, for drawings, flow charts, and/or flow diagrams illustrating methods or processes, rectangular blocks are "processing blocks" that can represent one or more instructions (or groups of instructions), such as computer software instructions. The diamond shaped blocks are "decision blocks," that one or more instructions (or groups of instructions), such as computer software instructions, that affect the execution of the computer software instructions represented by the processing blocks. Alternatively, the processing and decision blocks represent actions performed by functionally equivalent circuits such as a digital signal processor circuit, a microcontroller, or an application specific integrated circuit (ASIC). Further, actions and blocks can be implemented using combinations of hardware and software.

The drawings, flow charts, block diagrams, and flow diagrams do not depict the syntax of any particular programming language. Rather, the drawings, flow charts, block diagrams, and flow diagrams flow illustrate the functional information one of ordinary skill in the art requires to fabricate circuits and/or to generate computer software to perform the processing required in accordance with the present invention. Note that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described herein are unordered meaning that, when possible, the steps can be performed in any convenient or desirable order.

Additionally, the software used to implement all or part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals.

In describing the embodiments of the invention illustrated in the figures, specific terminology (e.g., language, phrases, product brands names, etc.) is used for the sake of clarity. These names are provided by way of example only and are not limiting. The invention is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention.

Having described and illustrated the principles of the technology with reference to specific implementations, it will be recognized that the technology can be implemented in many other, different, forms, and in many different environments. The technology disclosed herein can be used in combination with other technologies. Accordingly, it is submitted that that the invention should not be limited to the described embodiments but rather should be limited only by the spirit and scope of the appended claims. In addition, all publications and references cited herein are expressly incorporated herein by reference in their entirety.

What is claimed is:

1. A power converter system configured to supply direct current (DC) power to a load, the power converter system comprising:

a power converter device responsive to an alternating current (AC) input voltage and configured to provide an output DC voltage;

an output voltage loop controller in operable communication with the power converter;

an output current loop controller in operable communication with the power converter;

an output power loop controller in operable communication with the power converter;

a foldback controller in operable communication with the power converter;

wherein the output voltage loop controller, the output current loop controller, the output power loop controller, and the foldback controller together control the power converter to provide a multi-sloped output characteristic, wherein the power converter provides:

a substantially constant output voltage when in a voltage mode controlled by the voltage loop controller;

an increasing output current while output voltage decreases, in a first constant power mode controlled by the power loop controller, wherein the output current is permitted to increase up to a first predetermined current limit point defined for the power converter;

a decreasing output current and decreasing output voltage, in a foldback mode controlled by the foldback controller, the foldback mode occurring after the output current reaches the first predetermined current limit point; and an increasing output current and decreasing output voltage, in a second power mode controlled by the power loop controller, wherein the output current is permitted to increase so long as the output voltage remains below a first predetermined charge limit threshold.

2. The power converter system of claim 1, wherein the foldback controller is implemented using the current loop controller, such that the power converter system is implemented using three controller loops.

3. The power converter system of claim 1, wherein the second power mode is controlled to provide an increasing current, at decreasing voltage and decreasing power, wherein the combination of increasing current, decreasing voltage, and decreasing power, is configured to be sufficient for initial charge-up of a predetermined capacitive load in operable communication with an output of the power converter.

4. The power converter system of claim 1, further comprising a current sense circuit configured to sense when the power converter has reached a predetermined maximum current output threshold, wherein when the predetermined maximum current threshold is reached the foldback controller is configured to cause the power converter to provide output current and voltage in accordance with the foldback mode.

5. The power converter system of claim 1, wherein the power converter is configured to dynamically monitor at least one of output voltage and output current and to dynamically define at least one threshold for going into at least one of voltage mode, first power mode, foldback mode, and second power mode, based at least in part on the at least one dynamically defined threshold.

6. The power converter system of claim 4, wherein the power converter is configured to dynamically monitor output current to determine whether a first predetermined overload condition has occurred and, if the overload condition has occurred, the foldback controller is configured to cause the power converter to go into foldback mode.

7. The power converter of claim 4, wherein the power converter is configured to dynamically monitor at least one of output current and output voltage, during foldback mode, to determine when a first predetermined threshold of output voltage and output current has been reached, the first predetermined threshold corresponding to a condition wherein the output power is at a predetermined safe level configured so that an arc flash occurring at that output power would be below a second predetermined threshold.

8. The power converter system of claim 1, wherein the power converter comprises a series resonant converter (SRC) having current limiting circuitry configured to limit output current if at least one of an overload and a fault condition occurs in the SRC.

9. The power converter of claim 8, further comprising an overload sense circuit configured to detect when an overload or fault condition occurs in the SRC and to generate a corresponding output current feedback signal for the foldback loop controller, wherein the foldback controller defines a threshold for controlling foldback mode based at least in part on the output current feedback signal.

10. The power converter of claim 1, wherein the power converter further comprises an output current limiting circuit configured to provide an overload current feedback signal, and wherein the output current loop controller is configured be responsive to sensed values of the power converter output current and overload current feedback signal and to modify its output current by adding a predetermined fraction of the overload current feedback signal to its current loop feedback control signal.

11. The power converter of claim 10, wherein the predetermined fraction ranges from about 0.3 to 0.7.

12. A method of supplying power from a power converter to a load, the power converter configured to provide an output voltage and an output current, method comprising:
controlling the power converter to provide substantially constant output voltage, when the power converter is in a voltage mode controlled by a voltage loop controller;
controlling the power converter to provide increasing output current while output voltage decreases, when the power converter is in a first constant power mode controlled by a power loop controller, wherein the output current is permitted to increase up to a first predetermined current limit point defined for the power converter;
controlling the power converter to provide a decreasing current and decreasing output voltage, when the power converter is in a foldback mode controlled by a foldback loop controller, the foldback mode occurring after the output current reaches the first predetermined current limit point; and
controlling the power converter to provide an increasing current and decreasing output voltage, in a second power mode controlled by the power loop controller, wherein the output current is permitted to increase so long as the output voltage remains below a first predetermined charge limit threshold.

13. The method of claim 12, wherein the second power mode corresponds to a fold-forward power mode.

14. The method of claim 12, further comprising controlling the second power mode, to provide an increasing current, at decreasing voltage and decreasing power, wherein the combination of increasing current, decreasing voltage, and decreasing power, is configured to be sufficient for initial charge-up of a predetermined capacitive load in operable communication with an output of the power converter.

15. The method of claim 12, further comprising sensing when the power converter has reached a predetermined maximum current output threshold, wherein when the predetermined maximum current threshold is reached the foldback controller is configured to cause the power converter to provide output current and voltage in accordance with the foldback mode.

16. The method of claim 12, further comprising:
dynamically monitoring at least one of output voltage and output current for the power converter;
dynamically monitoring an overload current signal for the power converter, the overload current signal based on information from a current limiting circuit in operable communication with the power converter; and
dynamically defining, based at least in part on at least one of output current, output voltage, and the overload current signal, at least one threshold for going into at least one of voltage mode, first power mode, foldback mode, and second power mode, based at least in part on the at least one dynamically defined threshold.

17. The method of claim 16, further comprising:
dynamically monitoring power converter output current and the overload current signal to determine whether a first predetermined overload condition has occurred; and
if the overload condition has occurred, controlling the power converter, using the foldback controller, to cause the power converter to go into foldback mode.

18. The method of claim 12, wherein the power converter comprises a series resonant converter (SRC), wherein the method further comprises:
detecting when an overload or fault condition occurs in the SRC; and
generating a corresponding output current feedback signal for the foldback loop controller, wherein the foldback loop controller defines a threshold for controlling foldback mode based at least in part on the output current feedback signal.

19. A power system for providing power to a common load, the power system comprising:
a plurality of power converters operably coupled in parallel to a common DC power bus to which one or more loads may be connected, each respective power converter comprising:
a power converter device responsive to an alternating current (AC) input voltage and configured to provide an output DC voltage;

an output voltage loop controller in operable communication with the power converter;

an output current loop controller in operable communication with the power converter;

an output power loop controller in operable communication with the power converter; and a foldback controller in operable communication with the power converter;

wherein the output voltage loop controller, the output current loop controller, the output power loop controller, and the foldback controller together control the power converter to provide a multi-sloped output characteristic, wherein the power converter provides:

a substantially constant output voltage when in a voltage mode controlled by the voltage loop controller;

an increasing output current while output voltage decreases, in a first constant power mode controlled by the power loop controller, wherein the output current is permitted to increase up to a first predetermined current limit point defined for the power converter;

a decreasing output current and decreasing output voltage, in a foldback mode controlled by the foldback controller, the foldback mode occurring after the output current reaches the first predetermined current limit point; and an increasing output current and decreasing output voltage, in a second power mode controlled by the power loop controller, wherein the output current is permitted to increase so long as the output voltage remains below a first predetermined charge limit threshold;

wherein the plurality of power converters cooperate to balance power provided to the common load via the DC power bus by balancing power provided to the common load among the plurality of power converters.

20. The power system of claim 19, wherein each respective power converter further comprises a respective output current limiting circuit configured to provide a respective overload current feedback signal, and wherein the output current loop controller is configured be responsive to sensed values of the power converter output current and overload current feedback signal and to modify its respective output current by adding a predetermined fraction of the respective overload current feedback signal to its respective current loop feedback control signal.

* * * * *